（12）United States Patent
Hibara et al.

(10) Patent No.: US 10,135,631 B2
(45) Date of Patent: Nov. 20, 2018

(54) ELECTRIC EQUIPMENT MANAGEMENT APPARATUS, ELECTRIC EQUIPMENT MANAGEMENT METHOD, AND ELECTRIC EQUIPMENT MANAGEMENT SYSTEM

(71) Applicant: Mitsubishi Electric Corporation, Tokyo (JP)

(72) Inventors: Naoyuki Hibara, Tokyo (JP); Yoshiaki Koizumi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 705 days.

(21) Appl. No.: 14/759,294

(22) PCT Filed: Dec. 9, 2013

(86) PCT No.: PCT/JP2013/082960
§ 371 (c)(1),
(2) Date: Jul. 6, 2015

(87) PCT Pub. No.: WO2014/109156
PCT Pub. Date: Jul. 17, 2014

(65) Prior Publication Data
US 2015/0358176 A1    Dec. 10, 2015

(30) Foreign Application Priority Data

Jan. 9, 2013   (JP) ................................. 2013-001774

(51) Int. Cl.
*G06F 19/00*    (2018.01)
*H04L 12/28*    (2006.01)
(Continued)

(52) U.S. Cl.
CPC .......... *H04L 12/2816* (2013.01); *G05B 15/02* (2013.01); *G06Q 10/00* (2013.01);
(Continued)

(58) Field of Classification Search
CPC combination set(s) only.
See application file for complete search history.

(56) References Cited

U.S. PATENT DOCUMENTS

2002/0075825 A1* 6/2002 Hills .................... H04W 16/18
                                                                370/329
2002/0091812 A1    7/2002 Ando et al.
(Continued)

FOREIGN PATENT DOCUMENTS

JP    2002-189648 A    7/2002
JP    2002-268783 A    9/2002
(Continued)

OTHER PUBLICATIONS

Jason et al., Classification of Household devices by electricity Usage Profiles, 2011, p. 403-412, International Conference on Intelligent Data Engineering and automated Learning.vol. 6936.*
(Continued)

*Primary Examiner* — Kidest Bahta
(74) *Attorney, Agent, or Firm* — Posz Law Group, PLC

(57) ABSTRACT

An equipment information acquirer acquires, from electric equipment connected to a network, equipment type information indicating the type of electric equipment and at least one of environment information and operation information. A display controller causes the equipment type information acquired by the equipment information acquirer and correlation support information based on at least one of the environment information and the operation information to be displayed on a monitor after correlating the two with each other. The environment information indicates the environment of an area in which the electric equipment is installed. The operation information indicates the operating status of the electric equipment.

13 Claims, 18 Drawing Sheets

(51) Int. Cl.
    *G05B 15/02*     (2006.01)
    *H05B 37/02*     (2006.01)
    *G06Q 30/00*     (2012.01)
    *G06Q 10/00*     (2012.01)
(52) U.S. Cl.
    CPC ......... *G06Q 30/01* (2013.01); *H05B 37/0218* (2013.01); *H05B 37/0227* (2013.01); *H05B 37/0254* (2013.01); *H05B 37/0263* (2013.01); *H05B 37/0272* (2013.01)

(56) References Cited

U.S. PATENT DOCUMENTS

| | | | |
|---|---|---|---|
| 2004/0255038 A1 | 12/2004 | Kuroda et al. | |
| 2005/0066039 A1 | 3/2005 | Ayatsuka et al. | |
| 2005/0096753 A1* | 5/2005 | Arling | G05B 15/02 700/11 |
| 2005/0286737 A1* | 12/2005 | Roberts | G06F 3/017 382/100 |
| 2008/0009324 A1* | 1/2008 | Patel | H04W 48/18 455/566 |
| 2009/0299504 A1 | 12/2009 | Kumazawa et al. | |
| 2011/0313693 A1* | 12/2011 | Inoue | G06Q 10/06 702/61 |
| 2012/0052829 A1* | 3/2012 | Lee | H04W 48/18 455/226.2 |
| 2013/0253726 A1 | 9/2013 | Murakami et al. | |

FOREIGN PATENT DOCUMENTS

| | | |
|---|---|---|
| JP | 2003-143147 A | 5/2003 |
| JP | 2004-328374 A | 11/2004 |
| JP | 2007-257137 A | 10/2007 |
| JP | 2009-290967 A | 12/2009 |
| JP | 2011-040961 A | 2/2011 |
| JP | 2012-047494 A | 3/2012 |

OTHER PUBLICATIONS

Extended European Search Report dated Jun. 27, 2016 issued in corresponding EP patent application No. 13871196.5.
Office Action dated Feb. 3, 2017 issued in corresponding CN patent application No. 201380069915.1 (and English translation).
Office Action dated Aug. 10, 2017 issued in corresponding EP patent application No. 13871196.5.
Office Action dated Oct. 11, 2017 issued in corresponding CN patent application No. 201380069915.1 (and English translation).
International Search Report of the International Searching Authority dated Jan. 28, 2014 for the corresponding international application No. PCT/JP2013/082960 (and English translation).
Office Action dated Jan. 28, 2014 issued in corresponding JP patent application No. 2013-001774 (and English translation).

* cited by examiner

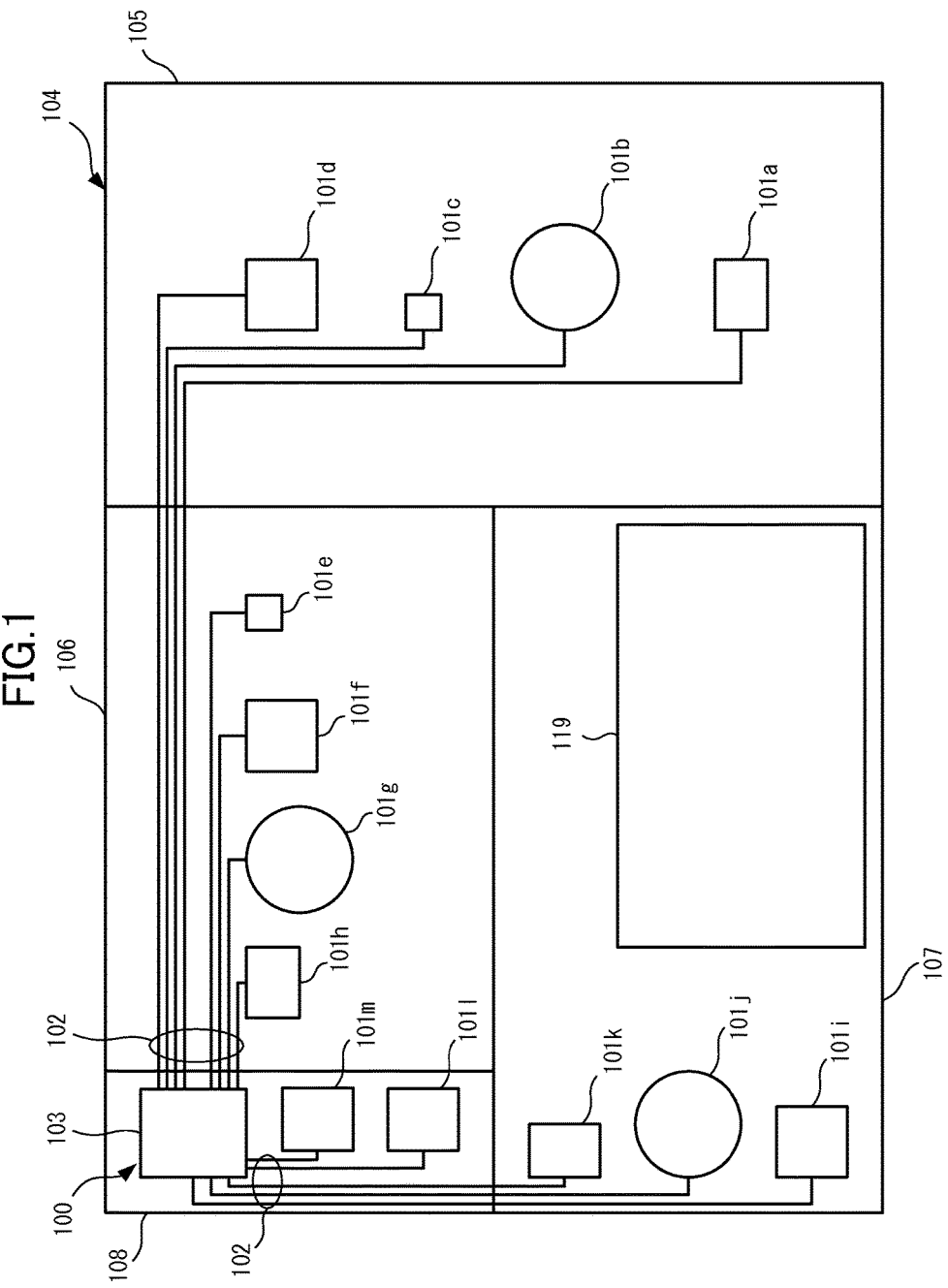

FIG.4

| EQUIP-MENT ADDRESS | EQUIPMENT TYPE INFORMATION | | | ENVIRONMENT INFORMATION | | | GROUP NUMBER | EQUIPMENT NAME |
|---|---|---|---|---|---|---|---|---|
| | EQUIPMENT TYPE | MAKER | MODEL NAME | TEMPER-ATURE | ILLUMI-NANCE | IMAGE | | |
| 1 | AIR CONDITIONER | AAA | XY-ZZZ | 22.5°C | – | IMAGE1 | 1 | LIVING ROOM AIR CONDITIONER |
| 2 | AIR CONDITIONER | AAA | XY-ZZZ | 15.0°C | – | – | 2 | BEDROOM AIR CONDITIONER |
| 3 | AIR CONDITIONER | BBB | A12345 | 23.0°C | 500lx | – | 3 | KITCHEN AIR CONDITIONER |
| 4 | TELEVISION | BBB | ZZXXX | 14.0°C | 200lx | IMAGE2 | 2 | BEDROOM TELEVISION |
| 5 | TELEVISION | CCC | ABC123 | – | 700lx | – | 1 | LIVING ROOM TELEVISION |
| 6 | IH COOKER | DDD | EE1234 | 23.5°C | – | – | 3 | IH COOKER |
| 7 | WATER HEATER | AAA | FF-123 | – | – | – | 4 | WATER HEATER |
| 8 | POWER CONDITIONER | EEE | S45 | 18.0°C | – | – | 5 | POWER CONDITIONER |
| 9 | LIGHTING EQUIPMENT | GGG | LL1234 | – | – | – | 2 | BEDROOM LIGHTING |
| 10 | LIGHTING EQUIPMENT | CCC | DEF456 | – | – | – | 3 | KITCHEN LIGHTING |
| 11 | LIGHTING EQUIPMENT | GGG | LL1234 | – | – | – | 1 | LIVING ROOM LIGHTING |
| 12 | ENVIRONMENT SENSOR EQUIPMENT | FFF | TT1234 | 23.0°C | 720lx | – | 1 | LIVING ROOM SENSOR |
| 13 | ENVIRONMENT SENSOR EQUIPMENT | FFF | TT1234 | 24.0°C | 550lx | – | 3 | KITCHEN SENSOR |

| EQUIPMENT ADDRESS | TIME | OPERATION |
|---|---|---|
| 1 | 10:00 | OFF |
| 1 | 10:35 | ON |
| 5 | 10:45 | ON |
| 3 | 11:25 | ON |
| 6 | 11:35 | ON |
| 5 | 11:50 | OFF |
| 6 | 11:50 | OFF |
| 1 | 12:00 | OFF |

| GROUP NUMBER | GROUP IDENTIFICATION INFORMATION | AVERAGE TEMPERATURE | AVERAGE ILLUMINANCE |
|---|---|---|---|
| 1 | LIVING ROOM | 22.7°C | 710lx |
| 2 | BEDROOM | 14.5°C | 200lx |
| 3 | KITCHEN | 23.5°C | 525lx |
| 4 | OTHER | – | – |
| 5 | OTHER | 18.0°C | – |

| DEGREE OF PRIORITY | EQUIPMENT TYPE |
|---|---|
| 1 | AIR CONDITIONER |
| 2 | TELEVISION |
| 3 | IH COOKER |
| 4 | LIGHTING |
| 5 | ENVIRONMENT SENSOR |
| 6 | POWER CONDITIONER |
| 7 | WATER HEATER |
| ... | ... |
| - | OTHER |

| DEGREE OF PRIORITY | SPECIFIC INFORMATION | GROUP IDENTIFICATION INFORMATION |
|---|---|---|
| 1 | IH COOKER | KITCHEN |
| 2 | REFRIGERATOR | KITCHEN |
| 3 | DINING TABLE | DINING ROOM |
| 4 | BED | BEDROOM |
| 5 | WATER HEATER | OTHER |
| 6 | POWER CONDITIONER | OTHER |
| 7 | - | ROOM |

130

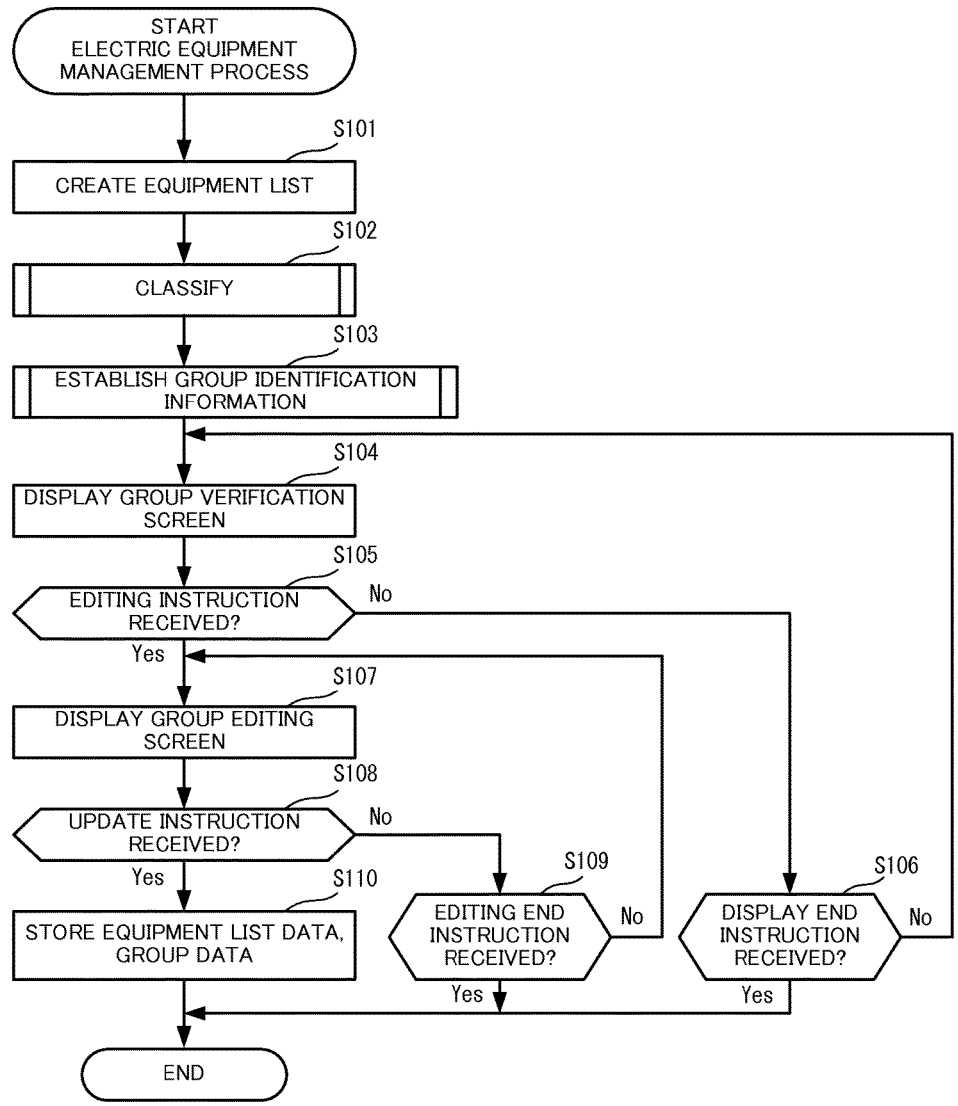

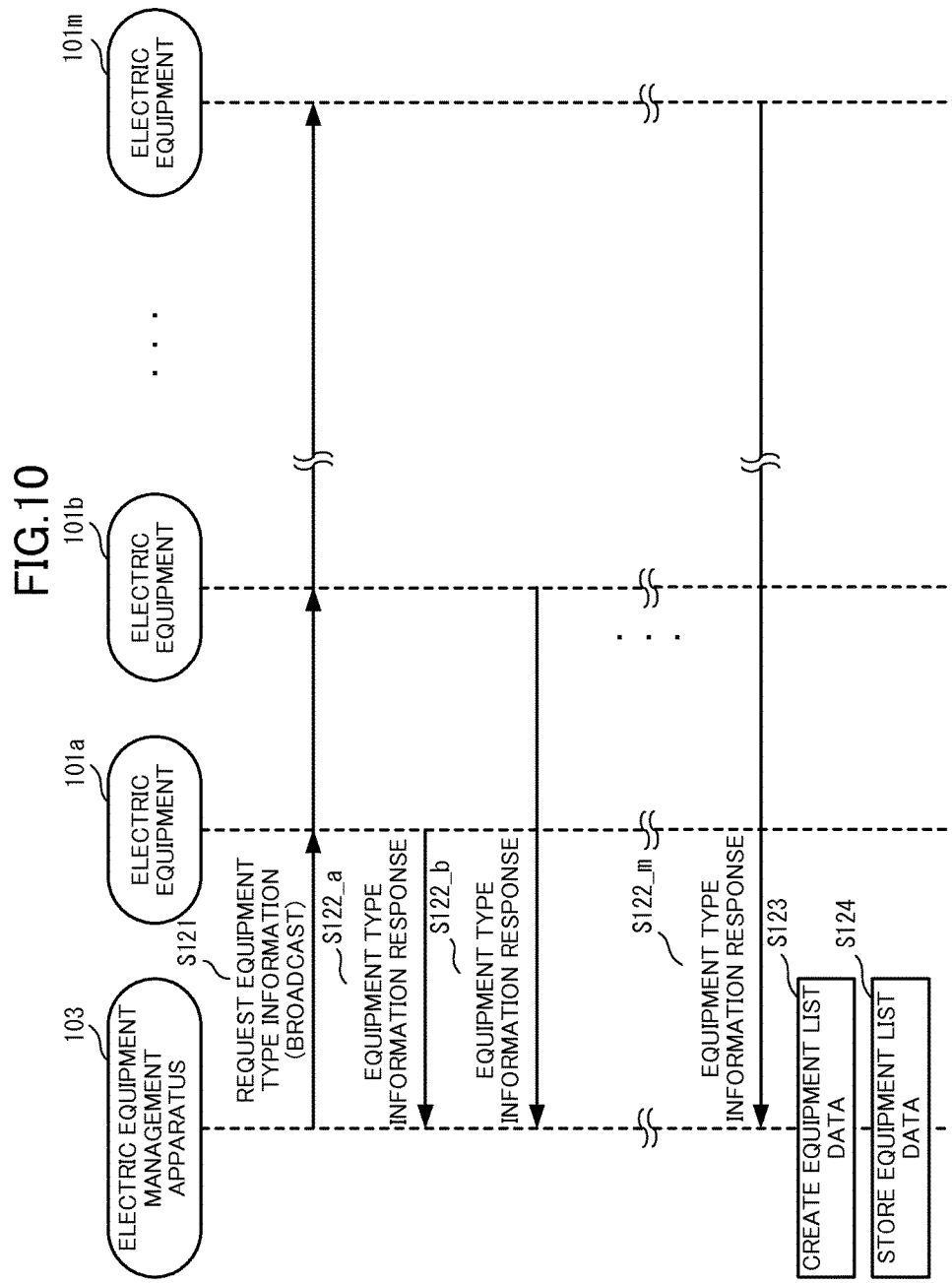

FIG.11

| EQUIP-MENT ADDRESS | EQUIPMENT TYPE INFORMATION ||| ENVIRONMENT INFORMATION ||| GROUP NUM-BER | EQUIPMENT NAME |
| --- | --- | --- | --- | --- | --- | --- | --- | --- |
| | EQUIPMENT TYPE | MAKER | MODEL NAME | TEMPER-ATURE | ILLUMI-NANCE | IMAGE | | |
| 1 | AIR CONDITIONER | AAA | XY-ZZZ | - | - | - | - | - |
| 2 | AIR CONDITIONER | AAA | XY-ZZZ | - | - | - | - | - |
| 3 | AIR CONDITIONER | BBB | A12345 | - | - | - | - | - |
| 4 | TELEVISION | BBB | ZZXXX | - | - | - | - | - |
| 5 | TELEVISION | CCC | ABC123 | - | - | - | - | - |
| 6 | IH COOKER | DDD | EE1234 | - | - | - | - | - |
| 7 | WATER HEATER | AAA | FF-123 | - | - | - | - | - |
| 8 | POWER CONDITIONER | EEE | S45 | - | - | - | - | - |
| 9 | LIGHTING EQUIPMENT | GGG | LL1234 | - | - | - | - | - |
| 10 | LIGHTING EQUIPMENT | CCC | DEF456 | - | - | - | - | - |
| 11 | LIGHTING EQUIPMENT | GGG | LL1234 | - | - | - | - | - |
| 12 | ENVIRONMENT SENSOR EQUIPMENT | FFF | TT1234 | - | - | - | - | - |
| 13 | ENVIRONMENT SENSOR EQUIPMENT | FFF | TT1234 | - | - | - | - | - |

| EQUIP-MENT ADDRESS | EQUIPMENT TYPE INFORMATION | | | ENVIRONMENT INFORMATION | | | GROUP NUMBER | EQUIPMENT NAME |
|---|---|---|---|---|---|---|---|---|
| | EQUIPMENT TYPE | MAKER | MODEL NAME | TEMPER-ATURE | ILLUMI-NANCE | IMAGE | | |
| 1 | AIR CONDITIONER | AAA | XY-ZZZ | 22.5°C | - | IMAGE1 | 1 | - |
| 2 | AIR CONDITIONER | AAA | XY-ZZZ | 15.0°C | - | - | 2 | - |
| 3 | AIR CONDITIONER | BBB | A12345 | 23.0°C | 500lx | - | 3 | - |
| 4 | TELEVISION | BBB | ZZXXX | 14.0°C | 200lx | IMAGE2 | 2 | - |
| 5 | TELEVISION | CCC | ABC123 | - | 700lx | - | 1 | - |
| 6 | IH COOKER | DDD | EE1234 | 23.5°C | - | - | 3 | - |
| 7 | WATER HEATER | AAA | FF-123 | - | - | - | 4 | - |
| 8 | POWER CONDITIONER | EEE | S45 | 18.0°C | - | - | 5 | - |
| 9 | LIGHTING EQUIPMENT | GGG | LL1234 | - | - | - | 2 | - |
| 10 | LIGHTING EQUIPMENT | CCC | DEF456 | - | - | - | 3 | - |
| 11 | LIGHTING EQUIPMENT | GGG | LL1234 | - | - | - | 1 | - |
| 12 | ENVIRONMENT SENSOR EQUIPMENT | FFF | TT1234 | 23.0°C | 720lx | - | 1 | - |
| 13 | ENVIRONMENT SENSOR EQUIPMENT | FFF | TT1234 | 24.0°C | 550lx | - | 3 | - |

| GROUP NUMBER | GROUP IDENTIFICATION INFORMATION | AVERAGE TEMPERATURE | AVERAGE ILLUMINANCE |
|---|---|---|---|
| 1 | – | 22.7°C | 710lx |
| 2 | – | 14.5°C | 200lx |
| 3 | – | 23.5°C | 525lx |
| 4 | – | – | – |
| 5 | – | 18.0°C | – |

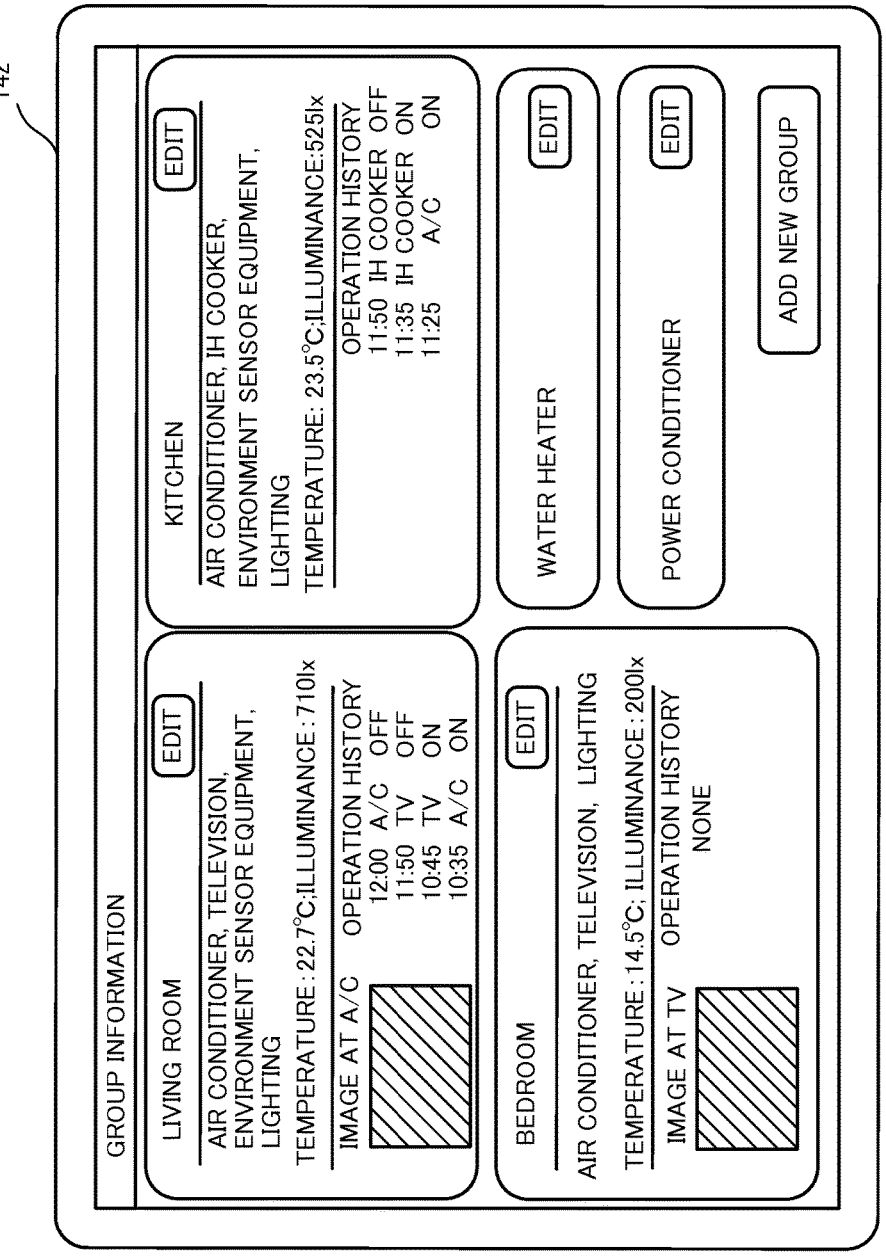

FIG.17

EDIT GROUP INFORMATION

GROUP NAME: LIVING ROOM

[ADD EQUIPMENT]

| | | | | | |
|---|---|---|---|---|---|
| 1 | LIVING ROOM AIR CONDITIONER | AIR CONDITIONER AAA/XY-ZZZ | 22.5°C<br>- | 12:00 OFF<br>10:35 ON | ▨ [DELETE] |
| 2 | LIVING ROOM TELEVISION | TELEVISION CCC/ABC123 | -<br>700lx | 11:50 OFF<br>10:45 ON<br>10:00 OFF | [DELETE] |
| 3 | LIVING ROOM ENVIRONMENT SENSOR EQUIPMENT | ENVIRONMENT SENSOR EQUIPMENT FFF/TT1234 | 23.0°C<br>720lx | - | [DELETE] |
| 4 | LIVING ROOM LIGHTING | LIGHTING GGG/LL1234 | -<br>- | - | [DELETE] |

[UPDATE]  [CANCEL]

143

ELECTRIC EQUIPMENT MANAGEMENT APPARATUS, ELECTRIC EQUIPMENT MANAGEMENT METHOD, AND ELECTRIC EQUIPMENT MANAGEMENT SYSTEM

CROSS REFERENCE TO RELATED APPLICATION

This application is a U.S. national stage application of International Patent Application No. PCT/JP2013/082960 filed on Dec. 9, 2013, which is based on and claims priority from Japanese Patent Application No. 2013-001774 filed on Jan. 9, 2013, the contents of which are incorporated herein by reference.

TECHNICAL FIELD

The present disclosure relates to an apparatus, method and system for managing electric equipment connected to a network.

BACKGROUND

Home network systems exist in which multiple pieces of electric equipment in a home are connected to a network and centrally managed using an electric equipment management apparatus. For example, a user can monitor the operating status of the electric equipment and operate the electric equipment by referencing information displayed on the electric equipment management apparatus.

Patent Literature 1 discloses art that can cause the external appearance of equipment connected to a network to be displayed in a remote location. Through this, it is possible to use the external appearance of the electric equipment in order to correlate the display information and the actual electric equipment with each other.

PATENT LITERATURE

Patent Literature 1: Unexamined Japanese Patent Application Kokai Publication No. 2002-268783.

However, there are cases in which multiple pieces of electric equipment possessing the same external appearance are connected to a network, which are the same type electric equipment having the same manufacturer and model number or the like. In such a case, with the art disclosed in Patent Literature 1, correlating the information displayed and the actual electric equipment with each other is difficult.

SUMMARY

In consideration of the foregoing, it is an objective of the present disclosure to provide an electric equipment management apparatus or the like capable of easily correlating the displayed information and the actual electric equipment with each other.

In order to achieve the above-described objective, an electric equipment management apparatus according to the present disclosure includes:

an equipment information acquirer configured to acquire, from electric equipment connected to a network and installed in any of multiple predetermined areas, equipment type information indicating the electric equipment type and environment information that is information relating to the environment of the area where the electric equipment is installed;

a classifier configured to classify the electric equipment by estimating the electric equipment installed in the same area, based on the environment information acquired by the equipment information acquirer; and a display controller configured to cause group identification information identifying a group of the electric equipment classified by the classifier, the equipment type information of the electric equipment and correlation support information obtained based on the environment information of the electric equipment to be displayed on a display correlated with each other.

With the present disclosure, equipment type information and correlated support information are displayed on a display. Consequently, it is possible to easily correlate the displayed information and the actual electric equipment with each other.

BRIEF DESCRIPTION OF DRAWINGS

FIG. 1 is a drawing showing the composition of an electric equipment management system according to an exemplary embodiment of the present disclosure;

FIG. 4 is a drawing showing one example of equipment list data;

FIG. 5 is a drawing showing one example of operation data;

FIG. 6 is a drawing showing one example of group data;

FIG. 7 is a drawing showing one example of classification priority data;

FIG. 8 is a drawing showing one example of settings rule data;

FIG. 9 is a flowchart showing the flow of an electric equipment management process according to the exemplary embodiment;

FIG. 10 is a drawing showing the flow of an equipment list creation process;

FIG. 11 is a drawing showing one example of equipment list data created by executing the equipment list creation process;

FIG. 13 is a drawing showing one example of equipment list data created by executing the classification process;

FIG. 14 is a drawing showing one example of group data created by executing the classification process;

FIG. 16 is a drawing showing one example of a group verification screen;

FIG. 17 is a drawing showing one example of a group editing screen;

DETAILED DESCRIPTION

Figure 2A:
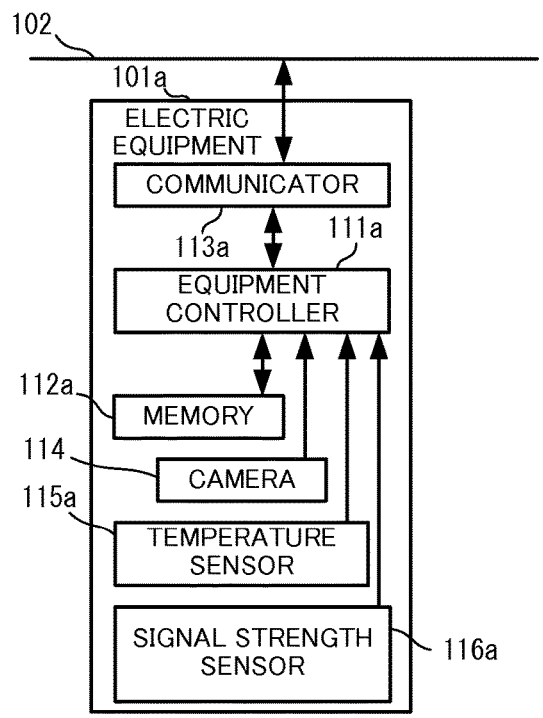
FIG. 2A is a drawing showing a first example of the composition of electric equipment according to the exemplary embodiment.
Figure 2B:
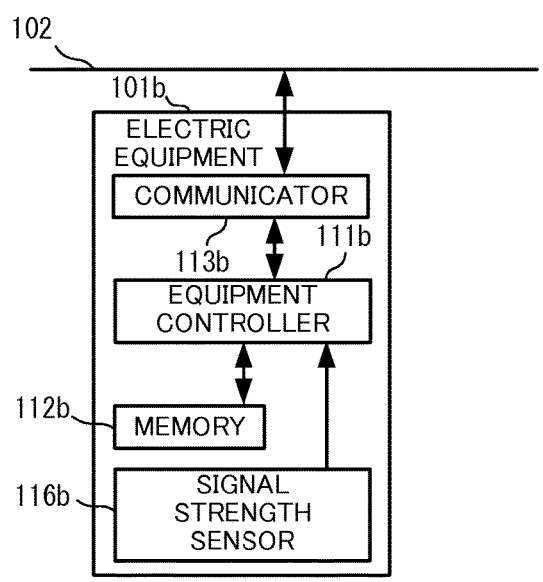
FIG. 2B is a drawing showing a second example of the composition of electric equipment according to the exemplary embodiment.
Figure 2C:
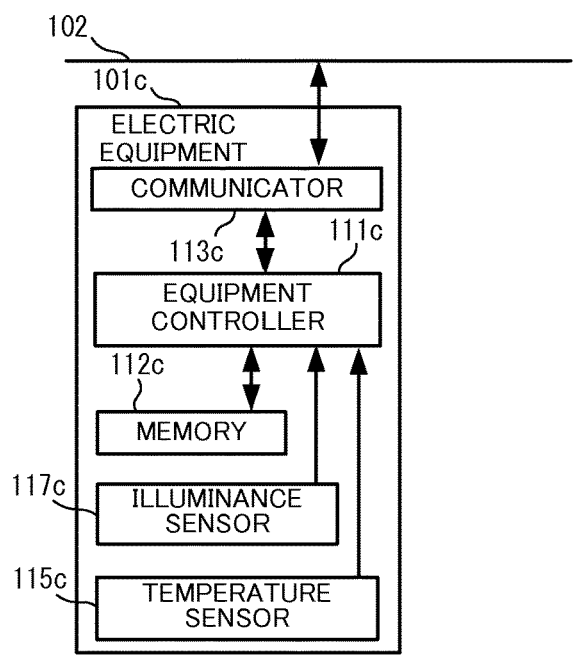
FIG. 2C is a drawing showing a third example of the composition of electric equipment according to the exemplary embodiment.
Figure 2D:
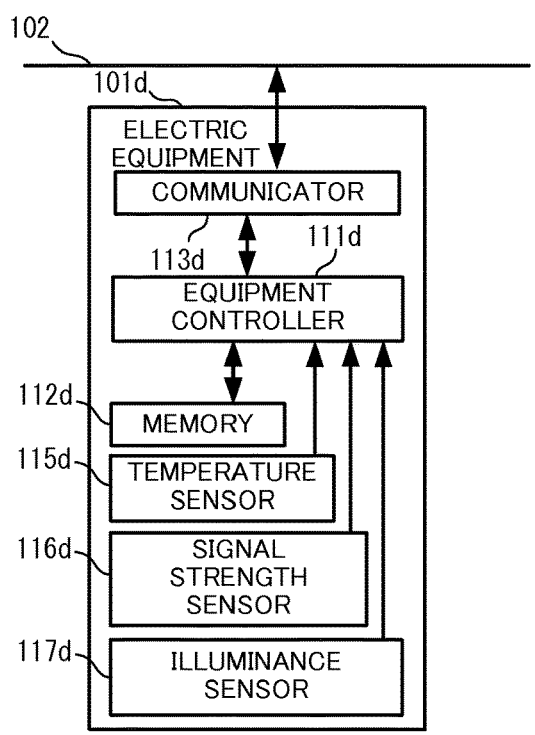
FIG. 2D is a drawing showing a fourth example of the composition of electric equipment according to the exemplary embodiment.

Below, an exemplary embodiment of the present disclosure is described with reference to the drawings. Throughout all of the drawings, the same reference signs are attached to the same elements.

An electric equipment management system 100 according to the exemplary embodiment of the present disclosure is a system to manage electric equipment 101a to 101m, and as shown in FIG. 1, comprises electric equipment 101a to 101m connected to a network 102, and an electric equipment management apparatus 103. The network 102 is built using a LAN (Local Area Network), power line transmission communication, various types of wireless communication and/or the like, and is connected to the electric equipment 101a to 101m and the electric equipment management apparatus 103 so as to enable mutual communication with each other.

The electric equipment 101a to 101m, as shown in FIG. 1, includes air conditioners, televisions, water heaters, lighting equipment and/or the like, and is disposed in a living room 105, kitchen 106, bedroom 107 and other areas ("other" is used hereinafter) 108 inside a residence 104.

The electric equipment 101a to 101d are respectively an air conditioner, lighting equipment, environment sensor equipment and a television, all installed in the living room 105, as shown in the drawing. The electric equipment 101e to 101h are respectively an environment sensor, an IH (Induction Heating) cooker, lighting equipment and an air conditioner, all installed in the kitchen 106. The electric equipment 101i to 101k are respectively a television, lighting equipment and an air conditioner, all installed in the bedroom 107. The electric equipment 101l and 101m are respectively a water heater and a power conditioner, installed in the other 108.

Each piece of electric equipment 101a to 101m generates environment information relating to the environment of the area in which each is installed, and transmits the generated environment information to the electric equipment management apparatus 103 via the network 102.

The above-described living room 105, kitchen 106, bedroom 107 and other 108 are examples of areas at least a portion of which is partitioned or areas divided by use application, in the residence 104 in which the network 102 is disposed. For example, the areas in the residence 104 may include, besides the above-described living room 105, kitchen 106 and bedroom 107, a dining room, a children's room, a storage room, a bath, a toilet and/or the like. In addition, the areas may be appropriately determined within space in which the network 102 is disposed, and for example may be areas within a constant distance from any of the electric equipment 101a to 101m.

Each of the pieces of electric equipment 101a to 101d in the electric equipment group installed in the living room 105 comprises, as shown in FIGS. 2A to 2D, an equipment controller 111a to 111d, a memory 112a to 112d and a communicator 113a to 113d. Furthermore, the electric equipment 101a comprises a camera 114, a temperature sensor 115a and a signal strength sensor 116a; the electric equipment 101b comprises a signal strength sensor 116b; the electric equipment 101c comprises a temperature sensor 115c and an illuminance sensor 117c; and the electric equipment 101d comprises a temperature sensor 115d, a signal strength sensor 116d and an illuminance sensor 117d.

Each of the pieces of electric equipment 101e to 101m, like the electric equipment 101a to 101d, comprises an equipment controller, a memory, a communicator and at least one of a camera, an illuminance sensor, a temperature sensor and a signal strength sensor.

In the explanation below, in cases when the electric equipment 101a to 101m are not particularly distinguished, the notation shall be of electric equipment 101. When the equipment controller, memory, communicator, camera, illuminance sensor, temperature sensor and signal strength sensor with which each of the pieces of electric equipment 101a to 101m is equipped are not particularly distinguished, the notation shall be of the equipment controller 111, the memory 112, the communicator 113, the camera 114, the temperature sensor 115, the signal strength sensor 116 and the illuminance sensor 117.

The camera 114 photographs objects installed in the area (living room 105, kitchen 106, bedroom 107, or other 108) in which the electric equipment 101 with the camera is installed. Through this, the camera 114 generates image information indicating photographed images as environment information indicating installed objects. For example, the electric equipment 101i that is the television installed in the bedroom 107 is provided with a camera, and this camera photographs a bed 119 installed in the bedroom 107. The camera 114 comprises for example a CMOS (Complementary Metal Oxide Semiconductor) image sensor, a CCD (Charge Coupled Device Image Sensor) image sensor and/or the like. For example, with electric equipment 101 that provides a user interface using an image shot by the camera 114, it would be fine for that camera 114 to also be used to generate image information as environment information.

With electric equipment 101 that shoots thermal images and controls operations based on the thermal images shot, the thermal image information generated by the thermal image camera for shooting thermal images may be utilized as environment information. In addition, it would also be fine to analyze the thermal images, determine whether or not there is a person in the area in which the electric equipment 101 is installed and utilize as environment information the number of people in that area, and/or the like.

The temperature sensor 115 measures the temperature of the areas 105 to 108 in which the electric equipment 101 provided with this sensor is installed. Through this, the temperature sensor 115 generates as environment information temperature information indicating the measured temperature.

The signal strength sensor 116 is a communication interface with which the communicator 113 of the electric equipment 101 provided with this sensor is capable of communicating wirelessly and, when signals emitted from the communicator 113 capable of wireless communication of another electric equipment 101 is received, measures the received signal strength of that signal. Through this, the signal strength sensor 116 generates signal strength information indicating the measured strength of the received signal as environment information indicating the status of radio waves.

The illuminance sensor 117 measures the illuminance of the areas 105 to 108 in which the electric equipment 101 provided with this sensor is installed. Through this, the illuminance sensor 117 generates as environment information illuminance information indicating the measured illuminance.

The equipment controller 111 controls the electric equipment 101 provided with this controller. Specifically, the equipment controller 111 accomplishes, for example, control for manifesting the original functions of the electric equipment 101 provided with this controller, accomplishes control for the electric equipment management apparatus 103 to manage the electric equipment 101, and/or the like. The equipment controller 111 comprises for example a processor that executes software programs installed in advance, and/or the like.

The original function of the electric equipment 101 is, for example in the case of the electric equipment 101a that is an air conditioner, the air conditioning function. In the case of the electric equipment 101b that is lighting equipment, the original function is the lighting function. In the case of the electric equipment 101c that is environment sensor equipment, the original function is the function of accomplishing measurements by sensors with which the equipment is provided. In the case of the electric equipment 101d that is a television, the original function is the function of showing images.

The memory 112 stores various pieces of information in the electric equipment 101 provided therewith. The information stored in the memory 112 is for example equipment address information indicating the address on the network 102, equipment type information, settings information indicating settings values and/or the like, software programs executed by the equipment controller 111, and/or the like. The memory 112 for example comprises RAM (Random Access Memory), flash memory and/or the like.

The equipment type information is information indicating the type of the electric equipment 101, and contains one or multiple of the equipment type, the manufacturer, a model name, a manufacturing number and/or the like, of the electric equipment 101. In this exemplary embodiment, this information includes "equipment type", "manufacturer" and "model name". For example, in the case of the electric equipment 101a, which is an air conditioner, the equipment type information stored in the memory 112a includes "air conditioner", "AAA" and "XY-ZZZ" respectively correlated with "equipment type", "manufacturer" and "model number".

The communicator 113 is a communication interface for communication with the electric equipment management apparatus 103 via the network 102.

When information is received from the electric equipment management apparatus 103, the communicator 113 transfers the received information to the equipment controller 111 of the electric equipment 101 provided with the communicator. When an instruction to transmit information generated in the equipment controller 111 of the electric equipment 101 provided therewith is received, the communicator 113 transmits that information to the electric equipment management apparatus 103.

The information transmitted by the communicator 113 is for example information in which environment information including at least one of image information, illuminance information, temperature information and received signal strength information, is correlated with equipment address information. The information transmitted by the communicator 113 is for example information in which equipment type information is correlated with equipment address information. The information transmitted by the communicator 113 is for example information in which operating information is correlated with equipment address information.

The operating information is information indicating the operating status of the electric equipment 101, and in this exemplary embodiment, is information including starting or stopping of the electric equipment 101, and the time thereof.

Figure 3:
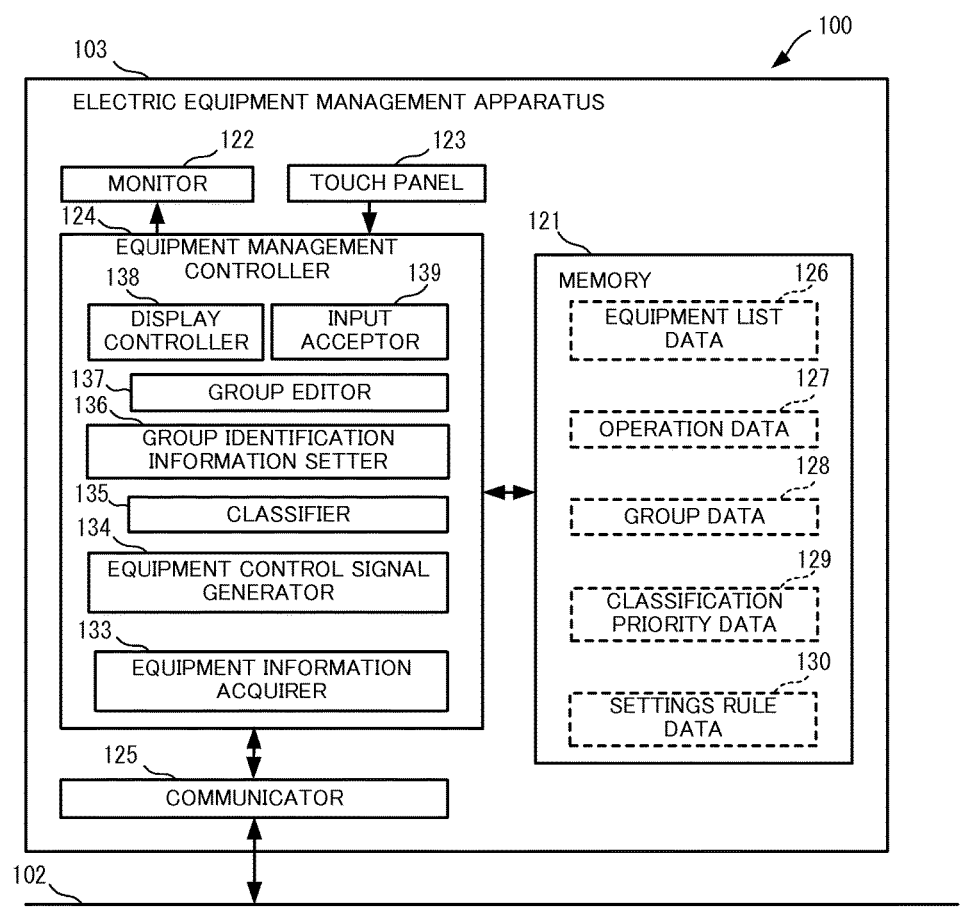
FIG. 3 is a drawing showing an example of the composition of an electric equipment management apparatus according to the exemplary embodiment.

Referring to FIG. 3, the electric equipment management apparatus 103 is an apparatus for managing the electric equipment 101a to 101d, and comprises a memory 121, a monitor 122, a touch panel 123, an equipment management controller 124 and a communicator 125.

The memory 121 stores various types of data, and for example comprises RAM, flash memory and/or the like. As shown in this drawing, the memory 121 stores equipment list data 126 as an equipment list memory, stores operation data 127 as an operations memory, stores group data 128 as a group memory, stores classification priority data 129 as a classification priority memory, and stores settings rule data 130 as a settings rule memory.

The equipment list data 126 is data comprising information related to the electric equipment 101 connected to the network 102, and as shown in FIG. 4, is data in which an equipment address, equipment type information, environment information, a group number and an equipment name are correlated with each other for piece of electric equipment 101.

As described above, the equipment address is information indicating the address of the electric equipment 101. The equipment addresses shown in the same figure are "1", "2" and so forth. The equipment address differs for each piece of electric equipment 101, and thus is also information for identifying the various pieces of electric equipment 101 in the electric equipment management apparatus 103.

As described above, the equipment type information is information indicating the type of electric equipment 101. In the same figure, the equipment list data 126 shown at the very top is an example corresponding to electric equipment 101a that is an air conditioner installed in the living room 105.

The environment information includes temperature information, illuminance information and image information in the equipment list data 126, and each is set for the corresponding location when each is generated and transmitted by the electric equipment 101. For example, the environment information of the electric equipment 101a in the equipment list data 126 exemplary shown in the same figure includes temperature information and image information, with the temperature information indicating "22.5° C." and the image information indicating "image 1".

The group number is information indicating a unique number for each group to which the electric equipment 101 belongs. Electric equipment 101 presumed in the electric equipment management apparatus 103 to be installed in the same area in the electric equipment management apparatus 103 belongs to this group. For example, in the equipment list data 126 shown in the same figure, the group number of the electric equipment 101a is set as "1".

The equipment name is information indicating a name set for the electric equipment 101, and that name is preferably such that a user can easily identify the electric equipment 101 on the display screen of the monitor 122. For example, the equipment name of the electric equipment 101a in the equipment list data 126 shown in the same figure is set as "living room air conditioner."

The operation data 127 is data indicating the operating status of the electric equipment 101 connected to the network 102. As shown in FIG. 5, the operation data 127 according to this exemplary embodiment is data in which the equipment address of the electric equipment 101, the action of starting or stopping of that electric equipment 101 and the time of that action are correlated with each other.

The group data 128 is data comprising information relating to the group, and as shown in FIG. 6, is data in which the group number, group identification information, average temperature and average illuminance are correlated with each other for each group.

As discussed above, the group number is information indicating a number unique to each group, and in the group data 128 shown in the same figure is for example "1" and/or the like.

The group identification information is information for identifying the group, and is such that a user can easily identify the area corresponding to the group on the display screen of the monitor 122. In the group data 128 shown in the same figure, the "group identification information" correlated with a "group number" of "1" is "living room."

The average temperature and the average illuminance are information indicating the average values of the temperature and illuminance, respectively, measured by the electric equipment 101 belonging to the group, and are examples of representative information for environment information representing that group. In the group data 128 shown in the same figure, the "average temperature" and "average illuminance" correlated with a "group number" of "1" are respectively "22.7° C." and "710 lx" (lux) and/or the like.

The classification priority data 129 is data for defining from which type of electric equipment 101 to give priority in classification, and as shown in FIG. 7, is data the equipment type, which is one of equipment type information, and a degree of priority are correlated with each other. In the same figure, for the electric equipment 101 that has not yet been classified into a group (unclassified electric equipment), for example, the "equipment type" contained in the equipment type information is classified into different groups in order starting with the electric equipment 101 that is "air conditioner", "television", "IH cooker", and so forth.

That is to say, for example if three air conditioners are unclassified, these three air conditioners are classified into different groups. This is because in many cases only one air conditioner is installed in an area inside the residence 104. After classifying the electric equipment 101 of the same group as each air conditioner, if the "equipment type" of the unclassified electric equipment 101 is "power conditioner" and "water heater", the electric equipment 101 that is "power conditioner" is classified first into different groups. Then, if the electric equipment 101 that is "water heater" is not classified into that group, that electric equipment 101 is further classified into different groups.

The settings rule data 130 is data that determines the rules for setting group identification information in the group data 128, and as shown in FIG. 8, the degree of priority, the specific information and the group identification information are correlated with each other.

The specific information indicates information having the possibility that the group identification information can be specified, and higher priorities are set in order from those with the highest possibility. In the example shown in the same figure, the "group identification information" of "kitchen" is correlated with the "specific information" indicating that the "equipment type information" is "IH cooker". The group in which "IH cooker" is installed has a high possibility of being "kitchen", and thus is correlated with "1" as the "degree of priority".

Refer now to FIG. 3. The monitor 122 is a device for displaying a screen to users as display means, and for example comprises a liquid crystal panel and/or the like. The touch panel 123 comprises a touch sensor and/or the like that receives input from a user by detecting a position where the user touches the monitor 122. In place of the touch panel 123, a physical button and/or the like may be utilized as the input device for input by the user.

The equipment management controller 124 accomplishes control for managing the electric equipment 101 connected to the network 102, and for example comprises a processor for executing a software program and/or the like stored in the memory 121. As shown in the same figure, the equipment management controller 124 comprises an equipment information acquirer 133, an equipment control signal generator 134, a classifier 135, a group identification information setter 136, a group editor 137, a display controller 138 and an input acceptor 139.

The equipment information acquirer 133 acquires information relating to the electric equipment 101 from the communicator 125 and stores this information in the memory 121.

The equipment control signal generator 134 generates signals to control the electric equipment 101. The equipment control signal generator 134 for example generates and transmits signals for regulating the brightness of electric equipment 101 that is lighting equipment. The equipment control signal generator 134 causes the generated signals to be transmitted to the communicator 125.

The classifier 135 classifies the electric equipment 101 into groups by estimating the electric equipment 101 installed in the same area, based on the environment information of the electric equipment 101 acquired by the equipment information acquirer 133.

The group identification information setter 136 sets group identification information in the group data 128 by referencing the equipment list data 126 and the settings rule data 130. The group identification information set here is that with a highest degree of priority that has not been set for another group in the equipment list data 126, out of the group identification information correlated with the image information or the equipment type information of the electric equipment 101 in the settings rule data 130.

The group editor 137 changes the classification of the group of the electric equipment 101 and the information relating to the group. Specifically, when post-change contents related to this information have been received, the group editor 137 causes the post-change contents to be stored in the memory 121.

The display controller 138 generates image information to be displayed on the monitor 122 and causes a screen made up of those images to be displayed on the monitor 122.

The input acceptor 139 accepts information input to the touch panel 123 and transfers the information to other processing units.

The communicator 125 is a communication interface for communicating with the electric equipment 101 via the network 102. When information is received from the electric equipment 101, the communicator 125 transfers the received information to the equipment management controller 124. When a command to transmit information generated in the equipment management controller 124 is received, the communicator 125 transmits the information to the electric equipment 101.

To this point, the compositions of the electric equipment management system 100 and the electric equipment management apparatus 103 according to the exemplary embodiment of the present disclosure have been described. Now, operation of the electric equipment management system 100 and the electric equipment management apparatus 103 will be described.

The electric equipment management apparatus 103 executes the electric equipment management process shown in FIG. 9 when the electric equipment 101 is connected to the network 102.

The equipment information acquirer 133 acquires equipment type information from the electric equipment 101 via the communicator 125, and creates an equipment list based on the acquired information (step S101).

In step S101, specifically the equipment information acquirer 133 transmits by broadcast a request for equipment type information to the electric equipment 101a to 101m, as shown in FIG. 10 (step S121). Each piece of electric equipment 101a to 101m responds to the request for equipment type information, and transmits the equipment type information (step S122_a to step S122_m). The equipment information acquirer 133 generates the equipment list data 126 (step S123) based on the equipment type information the communicator 125 received from each piece of electric equipment 101a to 101m, and stores the equipment list data 126 in the memory 121 (step S124).

In this exemplary embodiment, FIG. 11 shows an example of the equipment list data 126 created by executing the equipment list creation process (step S101). In the equipment list data 126 shown in this same figure, the equipment address and the electric equipment information are correlated with each other for each piece of electric equipment 101a to 101m.

It would be fine for requests for equipment type data to not be transmitted by broadcast but rather to be transmitted individually to each piece of electric equipment 101, or to be divided multiple times and transmitted. It would also be fine for the equipment list data 126 to be created based on the equipment type information acquired in response to that request. In addition, the electric equipment management apparatus 103 may create and retain registration information based on information automatically transmitted when each of the pieces of electric equipment 101 is connected to the network 102. Furthermore, it would be fine for the equipment information acquirer 133 to acquire that registration information and create the equipment list data 126. Furthermore, it would be fine for the equipment list data 126 to be created as occasion demands based on information automatically transmitted from each piece of electric equipment 101.

The classifier 135 classifies the electric equipment 101 estimated to be installed in the same area into the same group (step S102). This classification process is accomplished targeting all unclassified electric equipment 101.

Figure 12A:
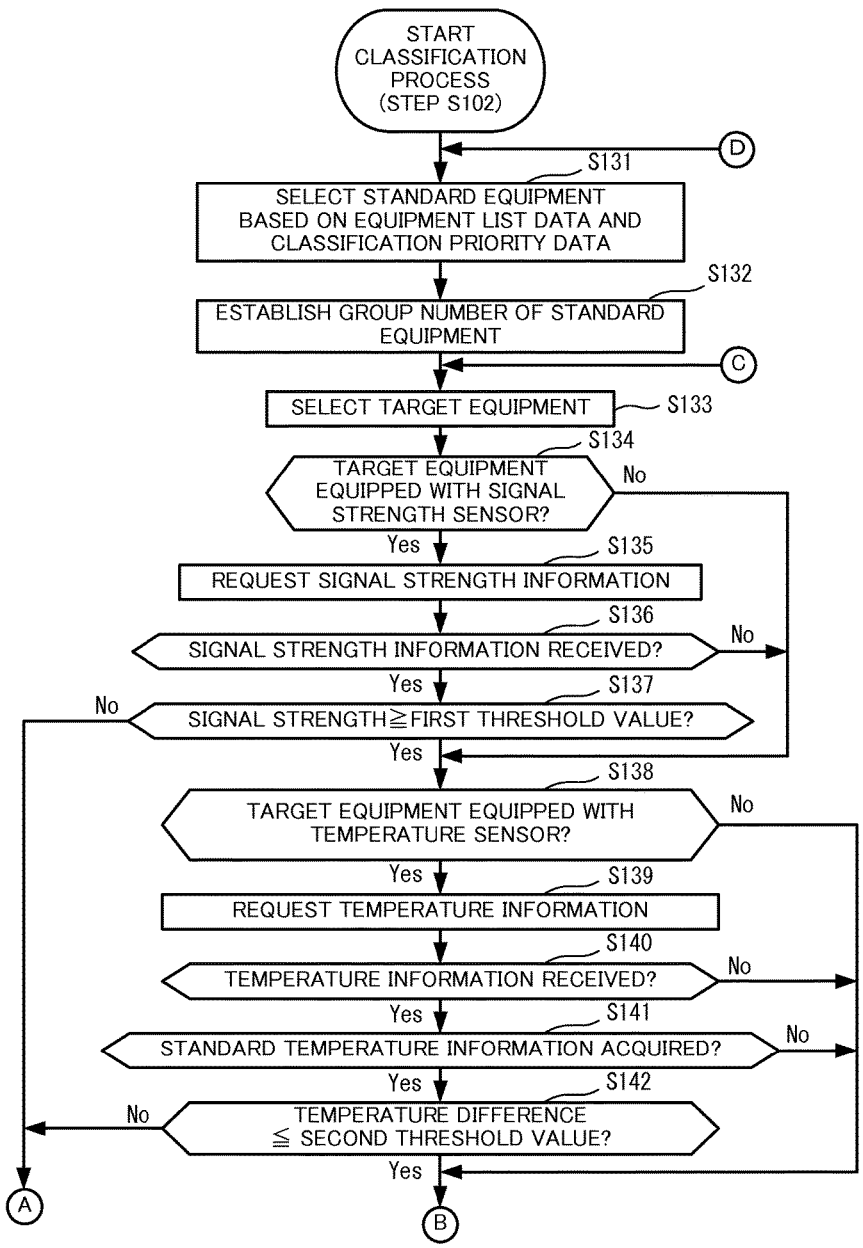
FIG. 12A is a flowchart showing the flow of a classification process according to the exemplary embodiment.
Figure 12B:
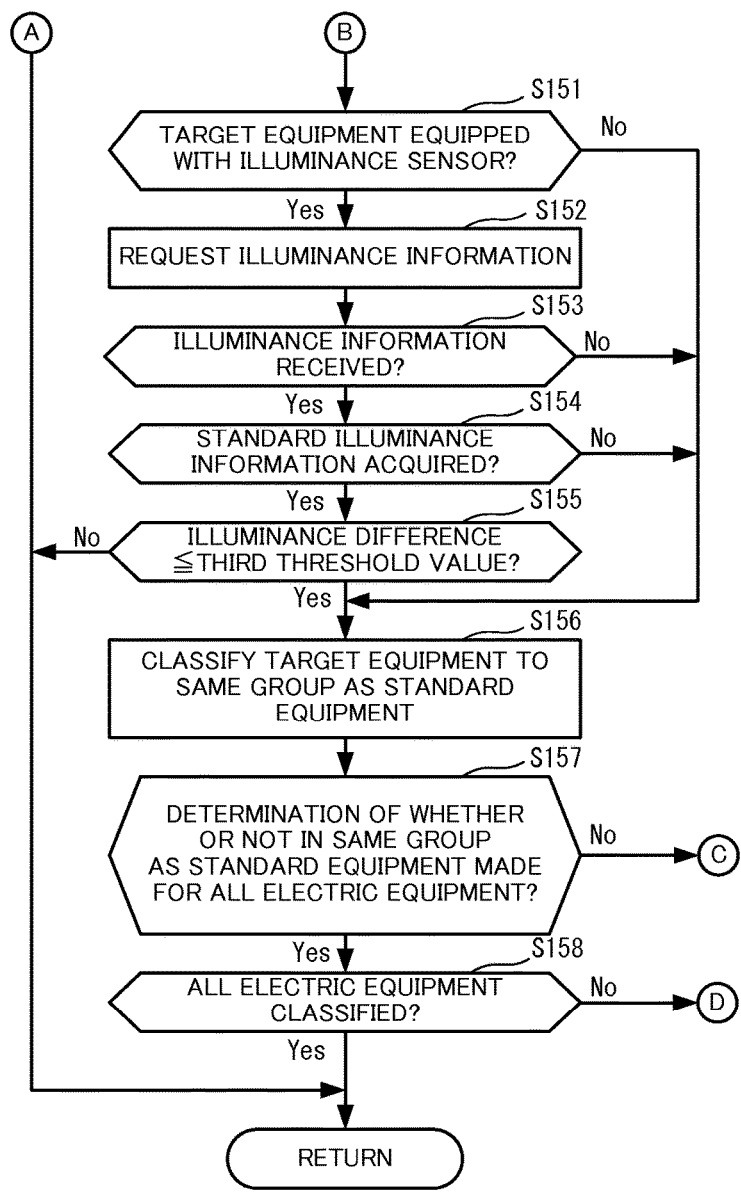
FIG. 12B is a flowchart showing the flow of a classification process according to the exemplary embodiment.

Specifically, as shown in FIG. 12A and FIG. 12B, the classifier 135 references the equipment list data 126 and the classification priority data 129 and selects as standard equipment one piece of equipment having the highest degree of priority out of the unclassified electric equipment 101 (step S131).

For example, when all of the electric equipment 101a to 101m is not classified into groups, the classifier 135 specifies the "air conditioner" correlated with the highest degree of priority (the smallest number) in the classification priority data 129 shown in FIG. 7. The classifier 135 selects as the standard equipment one piece of electric equipment whose "equipment type" is "air conditioner" in the equipment list data 126.

In this exemplary embodiment, there are three pieces of equipment whose "equipment type" is "air conditioner", as shown in the equipment list data 126 of FIG. 13. Any of these may be selected, but for example, the electric equipment 101a correlated with the smallest equipment address "1" is selected as the standard equipment.

The classifier 135 sets the group number of the standard equipment (step S132).

The group number set here may be arbitrarily assigned, but for example is a serial number. When the group number is initially set for the group to which the electric equipment 101a that is the standard equipment belongs, the classifier 135 sets the "group number" in the equipment list data 126 to "1".

The classifier 135 generates the group data 128 corresponding to that group number and stores the group data in the memory 121. When the standard equipment is equipped with the temperature sensor 115, the temperature measured by the temperature sensor 115 is stored in the "average temperature" of the group data 128. When the standard equipment is equipped with the illuminance sensor 117, the illuminance measured by the illuminance sensor 117 is stored in the "average illuminance" of the group data 128.

The classifier 135 selects target equipment that is the electric equipment 101 to be targets of determining whether or not the equipment is in the same group as the standard equipment (step S133). Selected as the target equipment is for example the equipment with the "equipment address" that is smallest from among the unclassified electric equipment 101. For example, the electric equipment 101k for which the "equipment address" is "2" is selected as the target equipment.

The classifier 135 determines whether or not the target equipment is equipped with the signal strength sensor 116, by receiving information from the target equipment via the network 102 (step S134). For example, suppose that the electric equipment 101k is the target equipment and is equipped with the signal strength sensor 116 the same as the electric equipment 101a (see FIG. 2A).

When it is determined that the target equipment is equipped with the signal strength sensor 116 (step S134: Yes), the classifier 135 requests signal strength information from the target equipment (step S135). This signal strength information for example indicates the reception strength when the communicator 113 of the target equipment receives wireless signals emitted from the communicator 113 of the standard equipment.

The classifier 135 determines whether or not the signal strength information is received within a predetermined time after execution of step S135, for example (step S136). When the signal strength information is received (step S136: Yes), the classifier 135 determines whether or not the signal strength indicated by the signal strength information is at least as great as a predetermined first threshold value (step S137).

Here, the first threshold value may be appropriately established, but for example is established as the minimum value of received signal strengths when installed in the same area. If the standard equipment is the electric equipment 101a in the living room 105 and the target equipment is the electric equipment 101m in the bedroom 107, the living room 105 and the bedroom 107 are often separated by a wall and/or the like. Consequently, even if the target equipment receives a signal from the standard equipment, the received signal strength thereof will be relatively small. By establishing the first threshold value as described above, it is possible to determine whether or not the standard equipment and the target equipment are installed in the same area.

When it is determined that the signal strength is less than the first threshold value (step S137: No), the classifier 135 concludes the classification process (step S102). For example, when the standard equipment is the electric equipment 101a in the living room 105 and the target equipment is the electric equipment 101m in the bedroom 107, the received signal strength is smaller than the first threshold value as discussed above. Consequently, the classifier 135 determines that the signal strength is less than the first threshold value and concludes the classification process (step S102).

When it is determined that the target equipment is not equipped with the signal strength sensor 116 (step S134: No), when it is determined that the signal strength information has not been received (step S136: No) or when it is determined that the signal strength is at least as great as the first threshold value (step S137: Yes), the classifier 135 determines whether or not the target equipment is equipped with the temperature sensor 115 for example by inquiring of the target equipment via the network 102 (step S138).

When it is determined that the target equipment is equipped with the temperature sensor 115 (step S138: Yes), the classifier 135 requests of the target equipment temperature information indicating the temperature measured by the temperature sensor 115 (step S139). For example, when the target equipment is the electric equipment (environment sensor equipment) 101c (see FIG. 2C), the classifier 135 determines that the temperature sensor 115 is provided and requests temperature information of the electric equipment 101c.

The classifier 135 determines whether or not temperature information is received within a predetermined time after execution of step S139, for example (step S140). When it is determined that the temperature information was received (step S140: Yes), the classifier 135 determines whether or not standard temperature information was acquired (step S141).

The standard temperature information is information indicating a standard temperature for the area of the group to which the target equipment belongs, and is appropriately established. For example, when the target equipment is equipped with the temperature sensor 115, the standard temperature may be the temperature measured by the temperature sensor 115, or may be the average of the temperatures measured by the temperature sensors 115 of the electric equipment 101 classified into the group to which the target equipment belongs.

When it is determined that standard temperature information was acquired (step S141: Yes), a determination is made as to whether or not the difference between the standard temperature and a temperature indicated by the temperature information acquired in step S140 is not greater than a second threshold value (step S142). It would be fine for the difference in temperatures arising within the same area to be established for the second threshold value.

When it is determined that the difference in temperatures is greater than the second threshold value (step S142: No), the classifier 135 concludes the classification process (step S102).

When it is determined that the target equipment is not equipped with the temperature sensor 115 (step S138: No), when it is determined that temperature information was not received (step S140: No), when it is determined that the standard temperature information was not acquired (step S141: No), or when it is determined that the difference in temperatures is not greater than the second threshold value (step S142: Yes), the classifier 135 determines whether or not the target equipment is equipped with the illuminances sensor 117, by receiving information from the target equipment via the network 102 (step S151 of FIG. 12B).

For example, when the standard equipment and the target equipment are the electric equipment 101a and the electric equipment 101c installed in the living room 105, the difference in temperatures is relatively small, so it is determined that the difference in temperatures is not greater than the second threshold value. Furthermore, the classifier 135 determines whether or not the target equipment is equipped with the illuminance sensor 117 by inquiring of the target equipment via the network 102, for example.

When it is determined that the target equipment is equipped with the illuminance sensor 117 (step S151: Yes), the classifier 135 requests of the target equipment illuminance information indicating the illuminance measured by the illuminance sensor 117 (step S152). For example, supposing that the target equipment is the electric equipment (environment sensor equipment) 101c (see FIG. 2C), the classifier 135 determines that the illuminance sensor 117 is provided.

The classifier 135 determines whether or not illuminance information is received within a predetermined time from execution of step S152, for example (step S153). When it is determined that illuminance information was received (step S153: Yes), the classifier 135 determines whether or not standard illuminance information was acquired (step S154).

Here, the standard illuminance information is information indicating a standard illuminance of the area for the group to which the target information belongs, and is appropriately established. For example, when the target equipment is equipped with the illuminance sensor 117, the standard illuminance may be the illuminance measured by the illuminance sensor 117, or may be the average of the illuminances measured by the illuminance sensor 117 of the electric equipment 101 classified into the group to which the target equipment belongs.

When it is determined that standard illuminance information was acquired (step S154: Yes), a determination is made as to whether or not the difference between the standard illuminance and the illuminance indicated by the illuminance information acquired in step S152 is not greater than a third threshold value (step S155). Here, it would be fine for the difference in illuminances arising in the same area to be set for the third threshold value.

When it is determined that the difference in illuminances is greater than the third threshold value (step S155: No), the classifier 135 concludes the classification process (step S102).

When it is determined that the target equipment is not equipped with the illuminance sensor 117 (step S151: No), when it is determined that the illuminance information was not received (step S153: No), when it is determined that the standard illuminance information was not acquired (step S154: No), or when it is determined that the difference in illuminances is not greater than the third threshold value (step S155: Yes), the classifier 135 classifies the target equipment into the same group as the standard equipment (step S156).

For example, when the standard equipment and the target equipment are the electric equipment 101a and the electric equipment 101c installed in the living room 105, the difference in illuminances is relatively small, so it is determined that the difference in illuminances is not greater than the third threshold value. Furthermore, the classifier 135 classifies the electric equipment 101c into the same group as the electric equipment 101a. Specifically, "1" is set as the "group number" of the equipment list data 126 corresponding to the electric equipment 101c.

At this time, when the classified electric equipment 101 is equipped with the temperature sensor 115, the classifier 135 acquires the average temperature of the group to which the electric equipment 101 is classified, from the group data 128. Furthermore, the classifier 135 computes the average temperature of the group, including the temperature measured by the temperature sensor 115 with which the classified electric equipment 101 is equipped. The classifier 135 stores the computed average temperature in the group data 128 as the "average temperature" of the group.

When the classified electric equipment 101 is equipped with the illuminance sensor 117, the classifier 135 computes the average illuminance of the group, including the temperature measured by the illuminance sensor 117, the same as in the case of the average temperature. The classifier stores the computed average illuminance in the group data 128 as the "average illuminance" of the group in which the electric equipment 101 is classified.

A determination is made as to whether or not determinations have been done for all of the electric equipment (step S157). For example, suppose that the standard equipment is the electric equipment 101a. When it has not been determined for all of the electric equipment 101b to 101m that has not been classified into a group whether or not this equipment belongs to the same group as the electric equipment 101a, the classifier 135 determines that determinations have not been made for all of the electric equipment (step S157: No), and returns to step S133.

For example, when it has been determined for all of the electric equipment 101b to 101m that has not been classified to a group whether or not the equipment belongs to the same group as the electric equipment 101a, the classifier 135 determines that determinations have been made for all of the electric equipment (step S157: Yes), and a determination is made as to whether or not all of the electric equipment 101 has been classified (step S158).

For example, when even one of the pieces of electric equipment 101a to 101m has not been classified to a group, the classifier 135 determines that all of the electric equipment 101 has not been classified (step S158: No), and returns to step S131.

When all of the electric equipment 101a to 101m has been classified into some group, the classifier 135 determines that all of the electric equipment 101 has been classified (step S158: Yes), and concludes the classification process (step S102). As a result of all of the electric equipment 101 being classified in this exemplary embodiment, the equipment list data 126 and the group data 128 stored in the memory 121 have the contents shown in FIG. 13 and FIG. 14 respectively, for example.

An example of classifying the electric equipment 101 based on signal strength information, temperature and illuminance was described, but it would be fine to classify the electric equipment 101 based on one or any two out of the signal strength information, temperature and illuminance. In addition, it is not necessary for each of the signal strength information, temperature and illuminance to be acquired every time the target equipment is classified, and for example it would be fine for the signal strength between the pieces of electric equipment 101, the temperature measured by the electric equipment 101 and the illuminance measured by the electric equipment 101 to each be acquired in advance by the electric equipment management apparatus 103 and to be stored in the memory 121. Furthermore, it would be fine for the classifier 135 to classify the electric equipment 101 through applying general clustering technology and/or the like to the signal strength, temperature and illuminance.

Returning to FIG. 9, the group identification information setter 136 sets the group identification information in the group data 128 (step S103).

Figure 15:
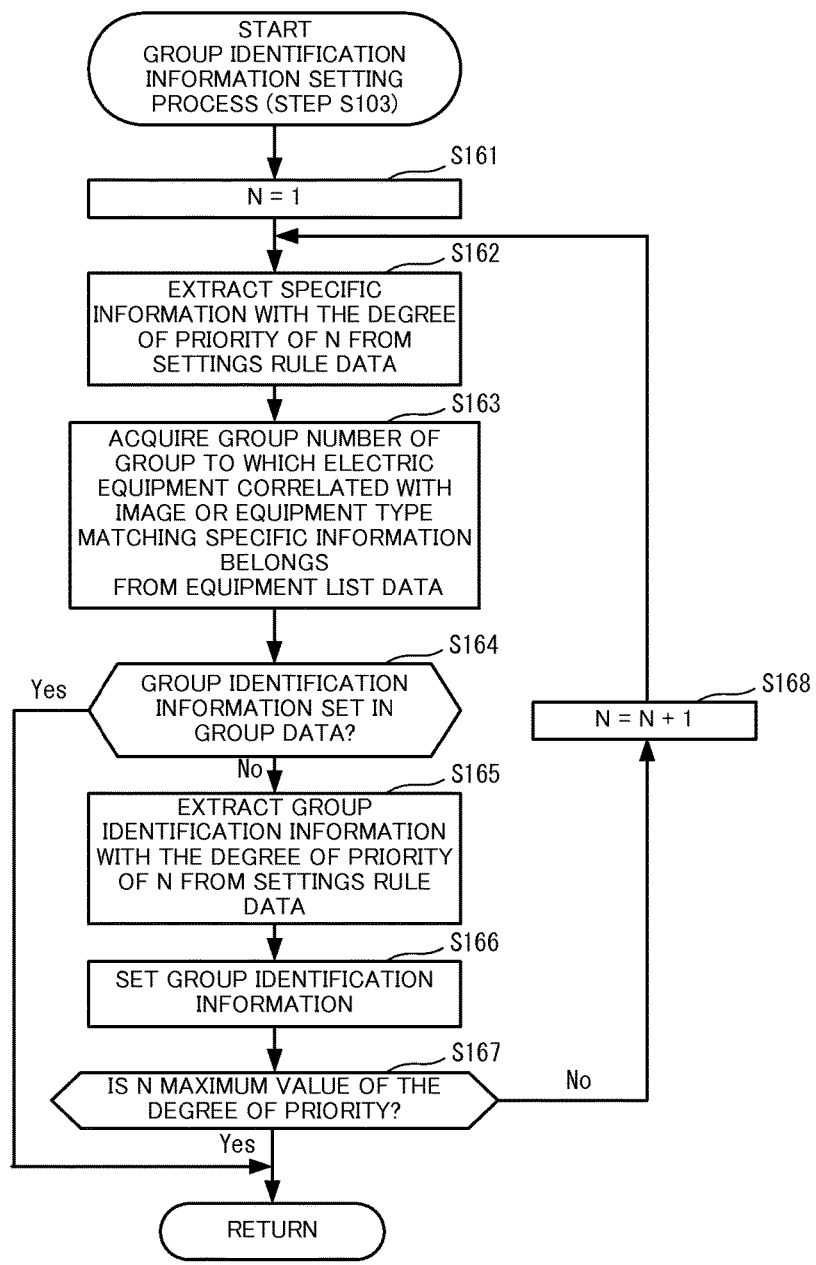
FIG. 15 is a flowchart showing the flow of a group identification information setting process.

Specifically, as shown in FIG. 15, the group identification information setter 136 sets N=1 (step S161). Here, N is a variable to which an integer 1 or greater can be assigned.

The group identification information setter 136 extracts specific information with the degree of priority of N from the settings rule data 130 (step S162). For example, when the settings rule data 130 has the contents shown in FIG. 8, and N=1, the group identification information setter 136 extracts "IH cooker", which is the "specific information" correlated with the "degree of priority" of "1".

The group identification information setter 136 specifies information corresponding to the specific information extracted in step S162 from the equipment list data 126. In this exemplary embodiment, the specific information corresponds to either the image information or the equipment type information of the equipment list data 126. The group identification information setter 136 acquires the group number of the group to which the electric equipment 101 correlated with the equipment type information or image information corresponding to the specific information belongs (step S163).

Here, "corresponding" means that when the specific information is the equipment type information, the specific information and the equipment type information of the equipment list data 126 match, and when the specific information is the image information, the specific information and the image information of the equipment list data 126 are similar. Whether or not the specific information and the image information of the equipment list data 126 are similar may be determined based on whether or not an image (for example, a bed, a dining table, etc.) with a degree of similarity at least as great as a threshold value is included in each, through pattern matching and/or the like, for example.

For example, in the equipment list data 126 shown in FIG. 13, the "group number" correlated with the "equipment type" that matches "IH cooker" is "3". Consequently, the group identification information setter 136 acquires "3" as the "group number" through executing step S163.

The group identification information setter 136 references the group data 128 and determines whether or not group identification information correlated with the group number acquired in step S163 has been set (step S164).

When it is determined that group identification information has been set in the group data 128 (step S164: Yes), the group identification information setter 136 concludes the group identification information setting process (step S103).

When it is determined that group identification information has not been set in the group data 128 (step S164: No), the group identification information setter 136 extracts from the settings rule data 130 the group identification information whose degree of priority is N (step S165).

When referencing the group data 128 of FIG. 14, the "group identification information" correlated with a "group number" of "3" is not set. Consequently, the group identification information setter 136 extracts from the settings rule data 130 shown in FIG. 8, for example, "kitchen", which is the "group identification information" whose degree of priority is "1".

The group identification information setter 136 sets the group identification information correlated with the group number acquired in step S163 in the group data 128 (step S166). When the "group number" acquired in step S163 is "3", "kitchen, which is the "group identification information" extracted in step S165, is set to correlate with the "group number" of "3" in the group data 128.

The group identification information setter 136 determines whether or not N is the maximum value of the priorities included in the settings rule data 130 (step S167).

When it is determined that N is not the maximum value of the degree of priority (step S167: No), the group identification information setter 136 substitutes N+1 for N (step S168) and returns to step S162.

When it is determined that N is the maximum value of the degree of priority (step S167: Yes), the group identification information setter 136 concludes the group identification information setting process (step S103). In this exemplary embodiment, as a result of the group identification information setting process (step S103) concluding, the equipment list data 126 and the group data 128 stored in the memory 121 respectively have the contents shown in FIG. 4 and FIG. 6, for example.

Returning to FIG. 9, the display controller 138 causes a group verification screen to be displayed on the monitor (step S104). The group verification screen is a screen for verifying the results of step S102 and step S103. Specifically, a group verification screen 142, for example as shown in FIG. 16, is a screen on which for each classified group the group identification information of that group, the equipment type information belonging to that group, the average temperature and average illuminance of that group, the image shot by the camera 114, and the operating status of the electric equipment 101 belonging to that group are correlated with each other.

The average temperature and average illuminance of that group, the image shot by the camera 114 and the operating status of the electric equipment 101 belonging to that group are examples of correlation support information. Here, the correlation support information is information supporting correlation so that the user can easily correlate the pieces of electric equipment 101 displayed and the actual electric equipment 101 installed in the residence 104. In this exemplary embodiment, the user correlating the electric equipment 101 displayed and the actual electric equipment 101 is made easy by supporting the user being able to easily correlate the groups and the electric equipment 101. The correlation support information may, for example, include at least one out of the environment information, the representative information and the operating status of the electric equipment 101. The environment information is not limited to the image shot by the camera 114, but may be any of the above-described pieces of environment information. The average temperature and the average illuminance are respectively the average values of the temperature and illuminance measured by the electric equipment 101 classified into the same group, and are environment information representing the group. The temperature and illuminance are not restricted to numerical values but may also be displayed with icons and/or the like.

The group editor 137 determines whether or not the user's editing instructions were received, via the input acceptor 139 (step S105). When it is determined that editing instructions were not received (step S105: No), the group editor 137 determines whether or not a display end instruction was received. For example, when "to main menu" on the group verification screen 142 shown in FIG. 16 is touched by the user, the determination is that a display end instruction was received (step S106: Yes), and the electric equipment management process concludes. When it is determined that a display end instruction was not received (step S106: No), the display controller 138 continues the display process of the group verification screen (step S104).

For example, when any of the "edit" buttons on the group verification screen 142 shown in FIG. 16 is touched by the user, the group editor 137 determines that an edit instruction was received (step S105: Yes), and causes the display controller 138 to display a group editing screen on the monitor 122 (step S107). For example, when the "edit" button correlated with the "living room" in the group verification screen 142 shown in FIG. 16 is touched, a group editing screen 143 shown in FIG. 17 is displayed on the monitor 122. The user for example can change the group identification information, the type of the electric equipment 101 and/or the like of the group editing screen 143 shown in this same figure, delete information relating to specific pieces of electric equipment 101, and add information relating to the electric equipment 101.

The group editor 137 determines whether or not an update instruction from the user was received, via the input acceptor 139 (step S108).

When it is determined that an update instruction was received (step S108: Yes), the group editor 137 updates the equipment list data 126 and the group data 128 with the contents of the group editing screen 143 at the time the update instruction was received (step S110). For example, when the contents of the group editing screen 143 shown in this same figure are changed, deleted or added, and "update" on the group editing screen 143 is touched by the user, the group editor 137 determines that an update instruction was received, and updates the equipment list data 126 and the group data 128 with the contents that were changed, deleted or added.

When it is determined that an update instruction has not been received (step S108: No), the group editor 137 determines whether or not an edit end instruction was received (step S109).

If it is not determined that an edit end instruction was received (step S109: No), the display controller 138 continues the display of the group editing screen (step S107). For example, when the "cancel" button of the group editing screen 143 shown in FIG. 17 is touched by the user, the group editor 137 determines that an edit end instruction was received (step S109: Yes), and the electric equipment management process concludes.

With this exemplary embodiment, the group identification information, the equipment type information of the electric equipment 101 and the correlation support information are displayed on the monitor 122, correlated with each other.

The user typically knows what type of electric equipment 101 is installed in what area. Consequently, by having the group identification information and the equipment type information of the electric equipment 101 correlated with each other, it is possible to guess which actual electric equipment 101 the electric equipment 101 is.

The temperature, illuminance and image displayed as the correlation support information makes it possible for the user to intuitively guess in what area each is. For example, in the case of the temperature, from the user's effective temperature and differences in sunlight in each of the areas 105 to 108, it is possible for the user to guess to which area the displayed temperature belongs. In the case of illuminance, even if the user does not understand the brightness displayed with lx, by comparing the values respectively correlated with the areas 105 to 108, it is possible for the user to guess to which area the displayed illuminance belongs. In the case of the image, the user can guess to which area the displayed image belongs from the furniture shown in the image, the pattern of the wall and/or the like.

In many cases the user has used the electric equipment 101 in the various areas and can grasp the operating status of the electric equipment 101. Consequently, if the operating status of the electric equipment 101 displayed as correlation support information is viewed, it is possible to guess what actual electric equipment that electric equipment 101 is.

Accordingly, by perusing the correlation support information, the user becomes able to easily correlate the displayed electric equipment 101 and the actual electric equipment 101. Furthermore, if multiple pieces of information are displayed as correlation support information, the user becomes able to guess what actual electric equipment 101 the electric equipment 101 is using any of the pieces of displayed information as a clue, so it becomes possible to easily correlate the displayed electric equipment 101 and the actual electric equipment 101.

The classifier 135 classifies the electric equipment 101 based on the environment information. By utilizing multiple pieces of information for environment information in the classification process (step S102), it is possible to accurately classify the electric equipment 101 even when some of the information cannot be acquired from the electric equipment 101.

The group verification screen 142 in which the group identification information, the equipment type information and the correlation support information are correlated with each other, or the group editing screen 143, is displayed on the monitor 122. Through this, it is possible to peruse the classification results along with the correlation support information, so it becomes possible for the user to easily verify and correct the classification results.

The environment information is one or multiple of the wireless signal reception strength, temperature, illuminance and image. Consequently, it is possible to acquire this information through sensors with which the electric equipment 101 is equipped. Accordingly, it is possible to acquire environment information without the time and labor of the user. In addition, as to these sensors, electric equipment 101 capable of wireless communication is often equipped with the signal strength sensor 116 and air conditioners are often equipped with the temperature sensor 115. In this way, in many cases these sensors are normally provided in the electric equipment 101, making it possible to reduce the time and cost of adding such sensors.

The correlation support information is one or multiple of the wireless signal reception strength, illuminance, temperature, image and operating status. The wireless signal reception strength, illuminance, temperature and image are environment information, so as described above it is possible to acquire environment information without the time and labor of the user. Regarding the operating status as well, it is fine for the electric equipment 101 to transmit to the electric equipment management apparatus 103 information in accordance with the operation thereof when doing a predetermined operation, so it is possible to acquire the environment information without the time and labor of the user.

The group identification information setter 136 sets the group identification information based on the settings rule data 130. In general, the IH cooker and refrigerator are installed in the kitchen 106, the dining table is installed in the dining room, and the bed 119 is installed in the bedroom 107. In this manner, depending on the type of electric equipment 101 and the type of furniture, the area of installation can be largely determined. Through the settings rule data 130 in which the equipment type information or image of that object, the degree of priority corresponding to the accuracy with which the area of installation can be defined, and the group identification information are correlated with each other, it is possible to accurately set the group identification information. Through this, it is possible to ease the time and labor of the user setting the group identification information. In addition, it is possible to know a group's attributes from the group identification information, so it becomes possible to easily correlate the electric equipment 101 displayed and the actual electric equipment 101.

The classifier 135 does classifications with priority from the electric equipment 101 of a specific equipment type, based on the classification priority data 129. For example, an air conditioner is typically equipped with the temperature sensor 115 and is often equipped with a thermal image sensor. A television in many cases is equipped with the illuminance sensor 117. In this manner, by classifying the equipment as standard equipment in order from the electric equipment 101 equipped with numerous sensors and for which other types of environment information can be acquired, it becomes possible to efficiently classify the electric equipment 101.

The exemplary embodiment of the present disclosure was described above, but the present disclosure is not limited by this exemplary embodiment and also includes various variations of the exemplary embodiment, such as the variations illustrated below and/or the like.

For example, the equipment management controller 124, the monitor 122, the touch panel 123 and the memory 121 with which the electric equipment management apparatus 103 is equipped, along with the processing units 133 to 139 that exhibit the various functions of the equipment management controller 124 need not be comprised as a single apparatus, and may be comprised of multiple devices equipped with one or multiple of them. In this case, the functions with which the electric equipment management apparatus 103 is equipped may be realized through communication among the various devices.

For example, the electric equipment management apparatus 103 may be remotely operated from a mobile terminal by the electric equipment management apparatus 103 and a mobile terminal equipped with display and input functions being connected by means of the Internet, public telephone circuits and/or the like. In this case, the mobile terminal may function as the display and inputter of the electric equipment management apparatus 103 in place of the monitor 122 and the touch panel 123 of the electric equipment management apparatus 103, or along with these.

For example, when new electric equipment 101 is added to the network 102, the equipment information acquirer 133 recognizes the new electric equipment 101 and may create the equipment list data 126 corresponding thereto. The classifier 135 may classify the new electric equipment 101. The display controller 138 may display the results of classifying the new electric equipment 101 on the monitor 122. The group editor 137 may update the equipment list data 126 and the group data 128 in accordance with editing of the classification results. Through this, the new electric equipment 101 can be classified into an existing group at any time and a new group can be created as necessary. Furthermore, even when multiple pieces of electric equipment 101 are newly added, it is possible to easily correlate the display information and the actual electric equipment 101.

For example, with the exemplary embodiment, correlation support information is displayed for each group classified by the classifier 135 executing the classification process (step S102) (see FIG. 16, FIG. 17). However, it would be fine to display the correlation support information for each piece of electric equipment 101 without executing the classification process (step S102). In this case, it would be good to display at least one out of the image shot by the electric equipment 101, the measured temperature, the measured illuminance, the operation history and/or the like, for example, as the correlation support information.

Through this, the user becomes able to easily correlate which of the actual pieces of electric equipment 101 installed in the residence 104 each of the displayed pieces of electric equipment 101 is. As a result, it becomes possible for the user to manipulate a desired electric equipment 101 without mistaking the electric equipment 101 that is the target of manipulation, when accomplishing manipulation of various types of settings and/or the like in the electric equipment 101.

For example, it would be fine for the current operating status of each piece of electric equipment 101 to be included in the equipment list data 126 (see FIG. 4). Through this, it is possible to display the current operating status of the electric equipment 101 for each piece of electric equipment 101 or associated with each group. For example, when the user manipulates the electric equipment 101 using a remote control and/or the like, the results of that manipulation are promptly reflected in the display screen of the group verification screen 142 and/or the like. Accordingly, the user can easily correlate which of the actual pieces of electric equipment 101 installed in the residence 104 each of the displayed pieces of electric equipment 101 is.

(Variation 1)

For example, in the classification process (step S102), when the target equipment is lighting equipment and the standard equipment is equipped with the illuminance sensor 117, it would be fine for the electric equipment management apparatus 103 to change the brightness of the illuminance equipment in order to classify the target equipment into a group. In this case, it would be good to classify the target equipment into the same group as the standard equipment when the illuminance information generated by the illuminance sensor 117 of the standard equipment indicates illuminance in accordance with changes in the brightness of the target equipment.

Figure 18:
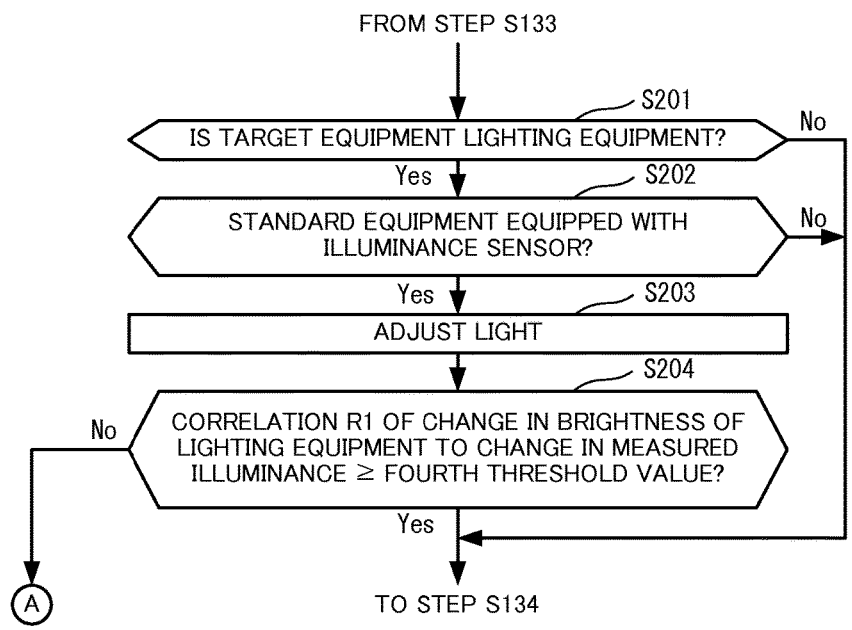
FIG. 18 is a flowchart showing the flow of characteristic portions included in the classification process according to a first variation.

FIG. 18 shows one example of a flowchart for making classifications by changing the brightness of the lighting equipment that is the target equipment. In this variation, the classifier 135 executes the process shown in FIG. 18 between step S133 and step S134 in FIG. 12A.

Specifically, as shown in this same drawing, the classifier 135 determines whether or not the target equipment is lighting equipment (step S201). For example, the classifier 135 acquires equipment type information from the target equipment or references the equipment list data 126, and may determine whether or not the target equipment is lighting equipment based on whether the "equipment type" of the target equipment is "lighting equipment".

When it is determined that the target equipment is lighting equipment (step S201: Yes), the classifier 135 determines whether or not the standard equipment is equipped with the illuminance sensor 117 (step S202).

When it is determined that the standard equipment is equipped with the illuminance sensor 117 (step S202: Yes), the equipment control signal generator 134 adjusts the light of the lighting equipment that is the target equipment (step S203). Specifically, the equipment control signal generator 134 generates a control signal to cause the brightness of the lighting equipment that is the target equipment to change, and causes the communicator 125 to transmit this signal to the lighting equipment. The method of causing the brightness to change may be for example gradually brightening or darkening, or causing flashing with a predetermined time interval, and/or the like.

The classifier 135 acquires the illuminance information generated by the illuminance sensor 117 of the standard equipment, and computes the correlation R1 between the change in the brightness of the lighting equipment and the illuminance measured by the illuminance sensor 117 of the standard equipment. The classifier 135 determines whether or not the correlation R1 is at least as great as a fourth threshold value (step S204).

Here, the average, minimum and/or the like of the correlation R1 obtained when the standard equipment and the lighting equipment are installed in the same area may be appropriately established as the fourth threshold value. The correlation is for example a correlation coefficient between the change in brightness of the lighting equipment and the change in illuminance measured by the illuminance sensor 117, when the lighting equipment is gradually brightened or darkened. In addition, when the lighting equipment is caused to flash at a predetermined time interval, for example, the correlation is the difference between the flash interval of the lighting equipment and the flash interval of the illuminance measured by the illuminance sensor 117 to the flash, the ratio of that difference to the flash period, and/or the like.

When it is determined that the target equipment is not lighting equipment (step S201: No), when it is determined that the standard equipment is not equipped with the illuminance sensor 117 (step S202: No), or when it is determined that the correlation R1 is at least as great as the fourth threshold value (step S204: Yes), the classifier 135 executes step S134. When it is determined that the correlation R1 is smaller than the fourth threshold value (step S204: No), the classifier 135 concludes the classification process (step S102).

With this variation, when the target equipment is lighting equipment, it is possible to classify the target equipment into a group based on changes in the brightness of the target equipment. Because the brightness of the target equipment can be controlled by the electric equipment management apparatus 103, it is possible to accurately classify the lighting equipment that is the target equipment.

(Second Variation)

For example, in the classification process (step S102), when the target equipment is equipped with the illuminance sensor 117 and there is lighting equipment classified into the group to which the standard equipment belongs, in order to classify that target equipment into a group, it would be fine for the electric equipment management apparatus 103 to cause the brightness of that lighting equipment to change. In this case, when the illuminance information generated by the illuminance sensor 117 of the target equipment indicates an illuminance in accordance with changes in the brightness of the lighting equipment, the target equipment may be classified into the same group as that lighting equipment.

Figure 19:
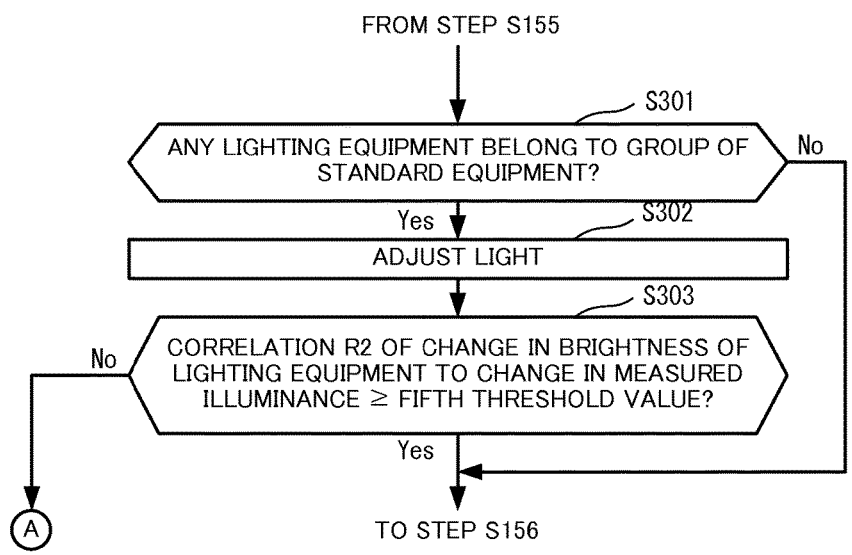
FIG. 19 is a flowchart showing the flow of characteristic portions included in the classification process according to a second variation.

FIG. 19 shows one example of a flowchart for classifying the target equipment by causing changes in the brightness of lighting equipment classified in the group to which the standard equipment belongs. In this variation, the classifier 135 executes the process shown in FIG. 19 between step S155 and step S156 shown in FIG. 12B.

Specifically, as shown in the same figure, the classifier 135 determines whether or not there is lighting equipment belonging to the group to which the standard equipment belongs, by referencing the equipment list data 126, for example (step S301).

When it is determined that there is lighting equipment that belongs to the group to which the standard equipment belongs (step S301: Yes), the equipment control signal generator 134 adjusts the light of that lighting equipment (step S302). The method of causing the brightness of the lighting equipment to change may be the same method as in step S203 of the first variation.

The classifier 135 acquires illuminance information generated by the illuminance sensor 117 of the target equipment and computes a correlation R2 between the change in brightness of the lighting equipment and the illuminance measured by the illuminance sensor 117 of the target equipment. The classifier 135 determines whether or not the correlation R2 is at least as great as a fifth threshold value (step S303).

The correlation R2 may be of the same type as the correlation R1 in the first variation. Like the fourth threshold value in the first variation, the fifth threshold value may be appropriately established in accordance with the correlation R2.

When it is determined that there is no lighting equipment that belongs to the group to which the standard equipment belongs (step S301: No), or when it is determined that the correlation R2 is at least as great as the fifth threshold value (step S303: Yes), the classifier 135 executes step S156. When it is determined that the correlation R2 is less than the fifth threshold value (step S303: No), the classifier 135 concludes the classification process (step S102).

With this variation, it is possible to classify the target equipment into a group based on changes in the brightness of lighting equipment that belongs to the same group as the standard equipment, when the target equipment is equipped with the illuminance sensor 117. Because the brightness of the lighting equipment can be controlled by the electric equipment management apparatus 103, it is possible to accurately classify the target equipment.

This application claims the benefit of Japanese Patent Application No. 2013-001774, filed on Jan. 9, 2013, the entire disclosure of which is incorporated by reference herein.

INDUSTRIAL APPLICABILITY

The disclosure according to this application can be used in an apparatus, method, system and/or the like for managing electric equipment connected to a network.

The invention claimed is:

1. An electric equipment management apparatus, comprising:
an equipment information acquirer configured to acquire, from electric equipment connected to a network and installed in any of multiple predetermined areas, equipment type information indicating an electric equipment type and environment information that is information relating to an environment of an area where the electric equipment is installed;
a classifier configured to classify the electric equipment into a group by estimating the electric equipment installed in a same area, based on the environment information acquired by the equipment information acquirer; and
a display controller configured to cause group identification information identifying the group of the electric equipment classified by the classifier, the equipment type information of the electric equipment and correlation support information obtained based on the environment information of the electric equipment to be displayed on a display correlated with each other, wherein
the equipment information acquirer acquires the environment information including a received signal strength of wireless signals transmitted from other electric equipment connected to the network and received by the electric equipment, and
the classifier classifies the electric equipment into a same group as the other electric equipment in response to the received signal strength included in the environment information acquired by the equipment information acquirer being not less than a threshold value.

2. The electric equipment management apparatus according to claim 1, wherein:
the equipment information acquirer acquires the environment information including an illuminance measured by an illuminance sensor possessed by the electric equipment; and
the classifier, when the difference between the illuminance included in the environment information acquired by the equipment information acquirer and a standard illuminance correlated to the group is not greater than a threshold value, classifies the electric equipment into the group correlated with the standard illuminance.

3. The electric equipment management apparatus according to claim 1, wherein:
the equipment information acquirer acquires the environment information including a temperature measured by a temperature sensor possessed by the electric equipment; and
the classifier, when the difference between the temperature included in the environment information acquired by the equipment information acquirer and a standard temperature correlated to the group is not greater than a threshold value, classifies the electric equipment into the group correlated with the standard temperature.

4. The electric equipment management apparatus according to claim 1, wherein:
the equipment information acquirer acquires the environment information including an image captured by an imaging sensor possessed by the electric equipment; and
when a degree of similarity, that indicates how much the image included in the environment information acquired by the equipment information acquirer is similar to a standard image correlated to the group is not less than a threshold value, the classifier classifies the electric equipment corresponding to the image included in the environment information into the group correlated with the standard image.

5. The electric equipment management apparatus according to claim 1, wherein:
the equipment information acquirer further acquires from the electric equipment, operating information indicating an operating status of the electric equipment; and
the display controller causes the correlation support information further including the operation status of the electric equipment, the group identification information and the equipment type information to be displayed on the display correlated with each other.

6. The electric equipment management apparatus comprising:
  an equipment information acquirer configured to acquire, from electric equipment connected to a network and installed in any of multiple predetermined areas, equipment type information indicating an electric equipment type and environment information that is information relating to an environment of an area where the electric equipment is installed;
  a classifier configured to classify the electric equipment into a group by estimating the electric equipment installed in a same area, based on the environment information acquired by the equipment information acquirer; and
  a display controller configured to cause group identification information identifying the group of the electric equipment classified by the classifier, the equipment type information of the electric equipment, and correlation support information obtained based on the environment information of the electric equipment to be displayed on a display correlated with each other;
  a settings rule memory configured to store settings rule data indicating rules for setting the group identification information for the group, and being data in which the equipment type information, the group identification information and a degree of priority are correlated with each other, the degree of priority indicating a relative probability that a type of an electric equipment indicated by the equipment type information is accurately classified into a group indicated by the group identification information; and
  a group identification information setter configured to set in the group to which the electric equipment is classified the information with a highest value of the degree of priority and not set to another group, out of the group identification information with which the equipment type information of the electric equipment is correlated in the settings rule data, in response to any of the group identification information contained in the settings rule data being not set in the group to which the electric equipment is classified by the classifier.

7. The electric equipment management apparatus according to claim 6, wherein:
  the settings rule data further includes data in which image information, the group identification information and the degree of priority are correlated with each other; and
  the group identification information setter, when any of the group identification information included in the settings rule data is not set in the group to which the electric equipment was classified by the classifier, and when an image captured by an imaging sensor possessed by the electric equipment is included in the environment information, sets in the group to which the electric equipment was classified the information with the highest value of the degree of the priority and not set to another group out of the group identification information correlated in the settings rule data with the equipment type information of the electric equipment, and the group identification information in which image information indicating an image, in which a degree of similarity indicating how much the standard image is similar to an image contained in the environment information is not less than a threshold value, is correlated in the settings rule data.

8. The electric equipment management apparatus according to claim 1, further comprising:
  a classification priority list memory configured to store classification priority data correlating the equipment type information and a classification priority for classifying a type of electric equipment indicated by the equipment type information with each other;
  wherein the equipment information acquirer acquires the equipment type information and the environment information from each of multiple pieces of the electric equipment; and
  the classifier, when the equipment type information and the environment information are acquired from each of multiple pieces of the electric equipment by the equipment information acquirer, classifies each of the pieces of the electric equipment based on the environment information acquired by the equipment type acquirer, in order from the electric equipment of a type indicated by the equipment type information correlated with a highest value of the classification priority in the classification priority data.

9. The electric equipment management apparatus according to claim 1, further comprising:
  an equipment control signal generator configured to (i) generate an equipment control signal that causes the illuminance of lighting equipment among the electric equipment to change and (ii) transmit the signal to the lighting equipment;
  wherein the classifier, when the illuminance is included in environment information acquired by the equipment information acquirer, and when there is correlation of at least a threshold value between change in the illuminance and change in the illuminance of the lighting equipment in accordance with the equipment control signal, classifies the electric equipment and the lighting equipment to the same group.

10. An electric equipment management method comprising:
  an equipment information acquisition step of acquiring, from electric equipment connected to a network and installed in any of multiple predetermined areas, equipment type information indicating the electric equipment type and environment information that is information relating to an environment of an area where the electric equipment is installed;
  a classification step of classifying the electric equipment by estimating the electric equipment installed in a same area, based on the environment information acquired; and
  a display control step of causing group identification information identifying a group of classified electric equipment, equipment type information of the electric equipment and correlation support information obtained based on the environment information of the electric equipment to be displayed on a display correlated with each other, wherein
  in the equipment information acquisition step, the environment information that is acquired includes a received signal strength of wireless signals transmitted from other electric equipment connected to the network and received by the electric equipment, and
  in the classification step, the electric equipment is classified into a same group as the other electric equipment in response to the received signal strength included in the environment information acquired by the equipment information acquirer being not less than a threshold value.

11. An electric equipment management system comprising:
- electric equipment installed in any of predetermined multiple areas, and an electric equipment management apparatus to manage the electric equipment are connected to a network; and
- the electric equipment is provided with sensors for outputting environment information that is information relating to an environment of an area where the electric equipment is installed;
- wherein the electric equipment management apparatus comprises:
- an equipment information acquirer configured to acquire, from the electric equipment, equipment type information indicating the electric equipment type and environment information output from the sensors with which the electric equipment is provided;
- a classifier configured to classify the electric equipment into a group by estimating the electric equipment installed in a same area, based on the environment information acquired by the equipment information acquirer; and
- a display controller configured to cause group identification information identifying the group classified by the classifier, the equipment type information of the electric equipment and correlation support information obtained based on the environment information of the electric equipment to be displayed on a display correlated with each other, wherein
- the equipment information acquirer acquires the environment information including a received signal strength of wireless signals transmitted from other electric equipment connected to the network and received by the electric equipment, and
- the classifier classifies the electric equipment into a same group as the other electric equipment in response to the received signal strength included in the environment information acquired by the equipment information acquirer being not less than a threshold value.

12. An electric equipment management method comprising:
- an equipment information acquisition step of acquiring, from electric equipment connected to a network and installed in any of multiple predetermined areas, equipment type information indicating an electric equipment type and environment information that is information relating to the environment of an area where the electric equipment is installed;
- a classification step of classifying the electric equipment into a group by estimating the electric equipment installed in a same area, based on the environment information acquired by the equipment information acquirer; and
- a display control step of causing group identification information identifying the group of the electric equipment classified by the classifier, the equipment type information of the electric equipment, and correlation support information obtained based on the environment information of the electric equipment to be displayed on a display correlated with each other;
- a settings rule memory step of storing settings rule data indicating rules for setting the group identification information for the group, and the settings rule data being data which correlates with each other the equipment type information, the group identification information, and a degree of priority indicating a relative probability that a type of electric equipment indicated by the equipment type information is accurately classified into a group indicated by the group identification information; and
- a group identification information setting step of setting in the group to which the electric equipment is classified the information with a highest value of the degree of priority and not set to another group, out of the group identification information with which the equipment type information of the electric equipment is correlated in the settings rule data, in response to any of the group identification information contained in the settings rule data being not set in the group to which the electric equipment is classified by the classifier.

13. An electric equipment management system comprising:
- electric equipment installed in any of predetermined multiple areas and an electric equipment management apparatus to manage the electric equipment are connected to a network; and
- the electric equipment is provided with sensors for outputting environment information that is information relating to the environment of an area where the electric equipment is installed;
- wherein the electric equipment management apparatus comprises:
- an equipment information acquirer configured to acquire, from the electric equipment, equipment type information indicating the electric equipment type and environment information output from the sensors with which the electric equipment is provided;
- a classifier configured to classify the electric equipment into a group by estimating the electric equipment installed in the same area, based on the environment information acquired by the equipment information acquirer; and
- a display controller configured to cause group identification information identifying the group classified by the classifier, the equipment type information of the electric equipment, and correlation support information obtained based on the environment information of the electric equipment to be displayed on a display correlated with each other;
- a settings rule memory configured to store settings rule data indicating rules for setting the group identification information for the group, and being data in which the equipment type information, the group identification information, and a degree of priority are correlated with each other, the degree of priority indicating a relative probability that a type of an electric equipment indicated by the equipment type information is accurately classified into the group indicated by the group identification information; and
- a group identification information setter configured to set in the group to which the electric equipment is classified the information with a highest value of the degree of priority and not set to another group, out of the group identification information with which the equipment type information of the electric equipment is correlated in the settings rule data, in response to any of the group identification information contained in the settings rule data being not set in the group to which the electric equipment is classified by the classifier.

* * * * *